March 1, 1938.  C. S. JOHNSON  2,109,534
CENTRAL MIXING PLANT
Filed June 27, 1935  12 Sheets-Sheet 1
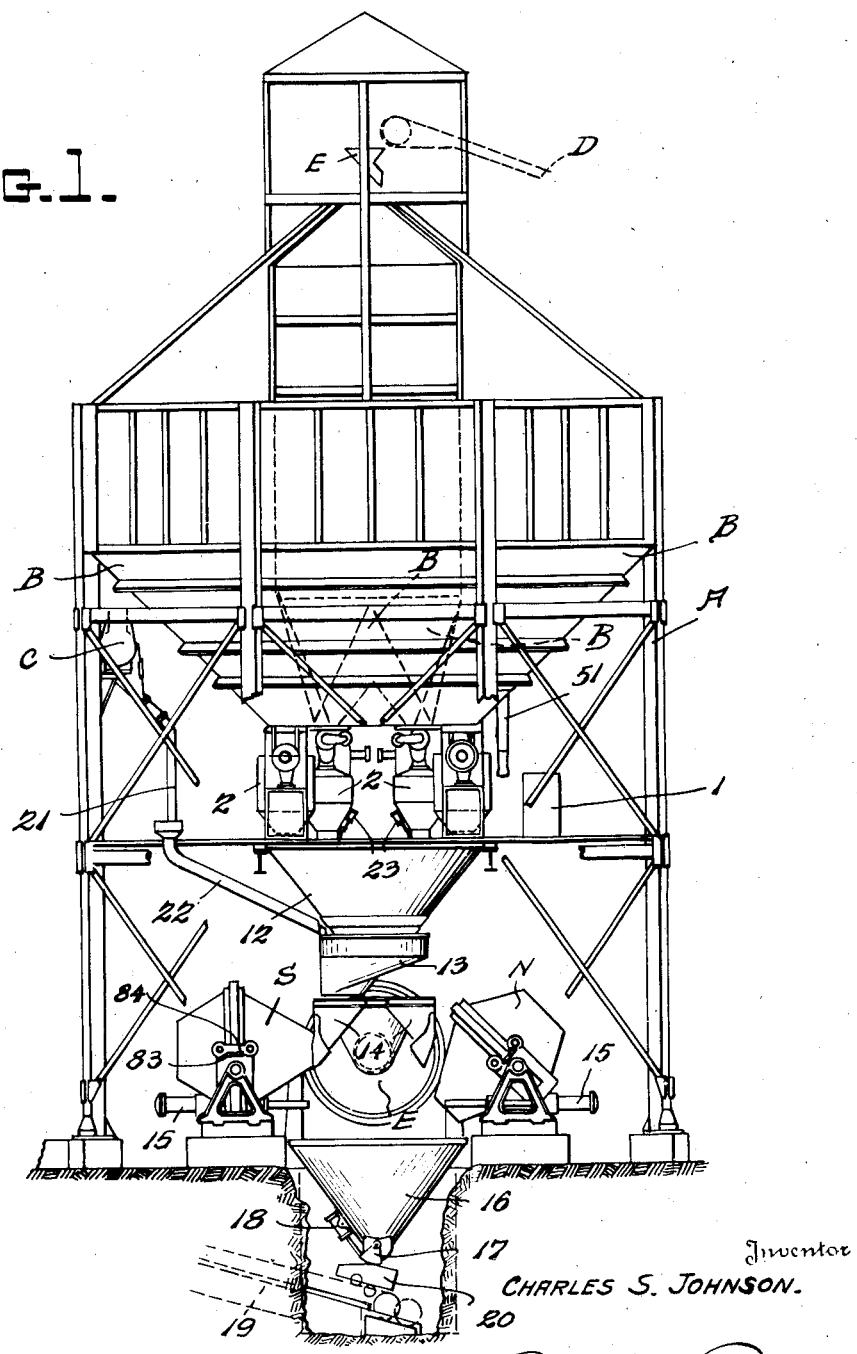

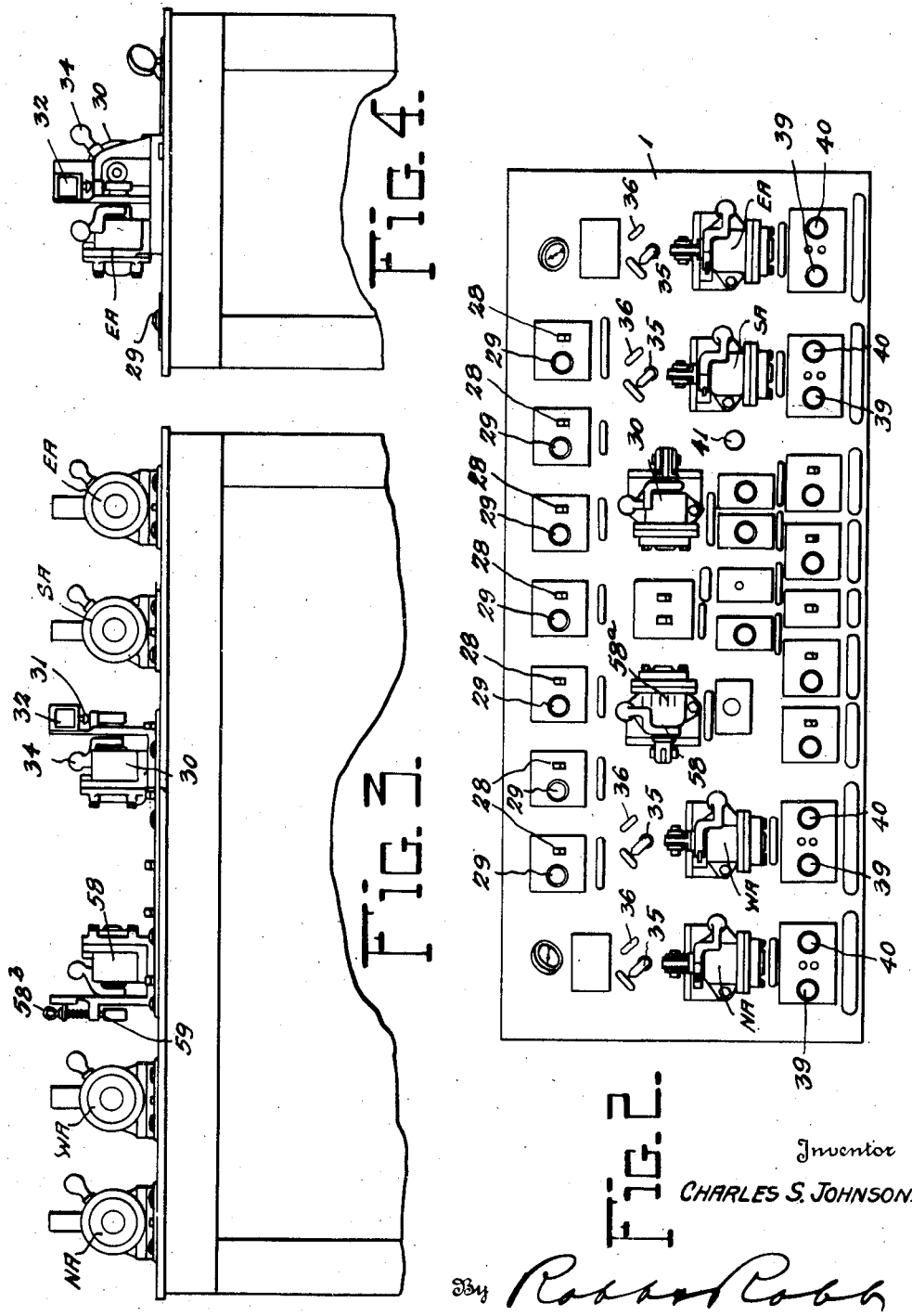

March 1, 1938.   C. S. JOHNSON   2,109,534
CENTRAL MIXING PLANT
Filed June 27, 1935   12 Sheets-Sheet 3
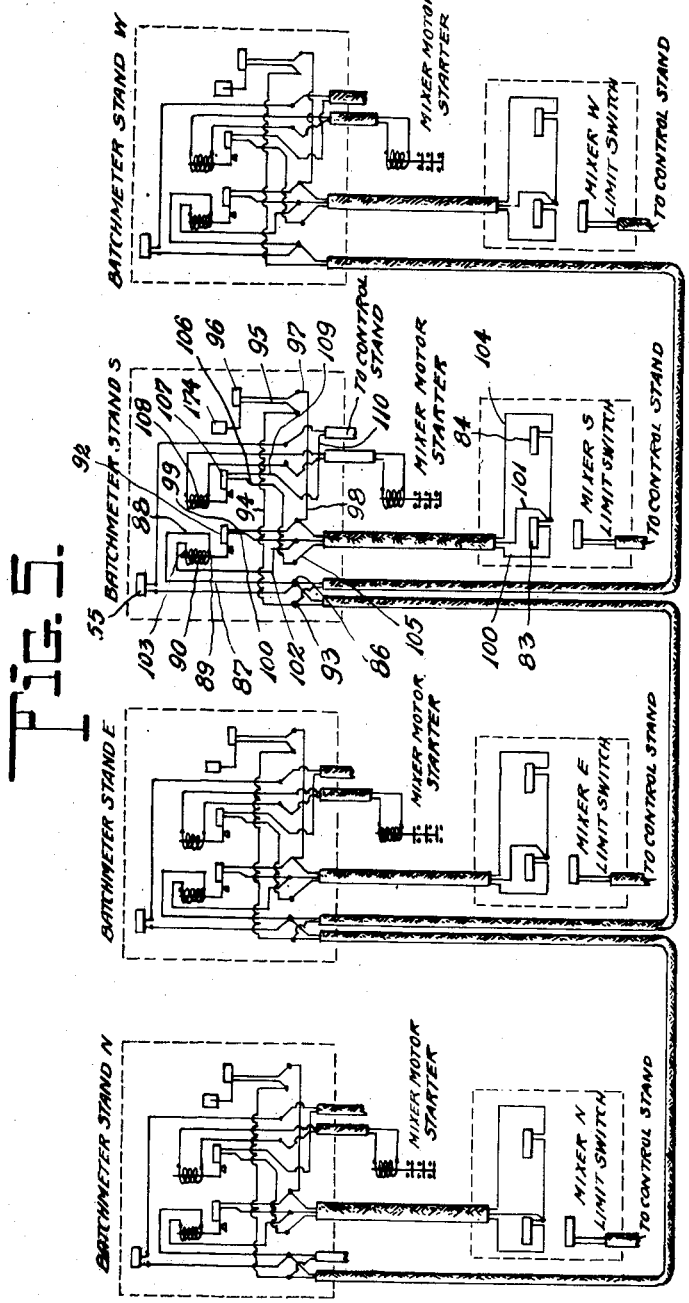
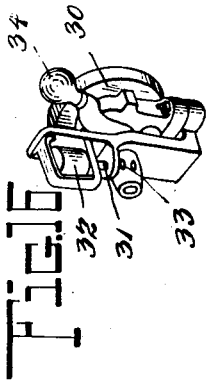
Inventor
CHARLES S. JOHNSON
By Robbs Cook
Attorneys March 1, 1938.  C. S. JOHNSON  2,109,534

CENTRAL MIXING PLANT

Filed June 27, 1935          12 Sheets-Sheet 4

Fig. 5.

Inventor
CHARLES S. JOHNSON.

March 1, 1938.　　　　C. S. JOHNSON　　　　2,109,534
CENTRAL MIXING PLANT
Filed June 27, 1935　　　12 Sheets-Sheet 5
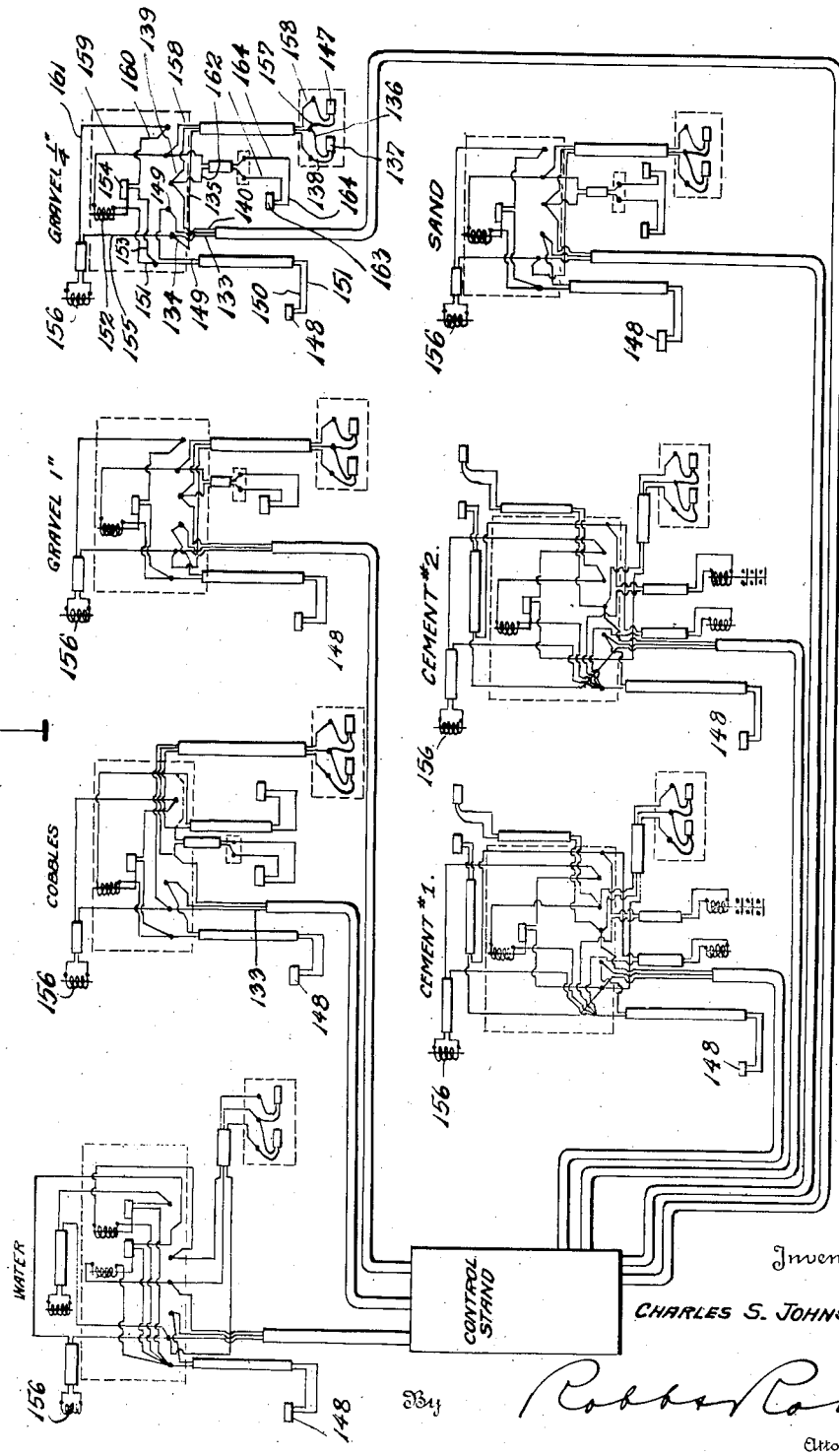
Inventor
CHARLES S. JOHNSON
By Robb & Robb
Attorneys March 1, 1938. C. S. JOHNSON 2,109,534
CENTRAL MIXING PLANT
Filed June 27, 1935 12 Sheets-Sheet 6
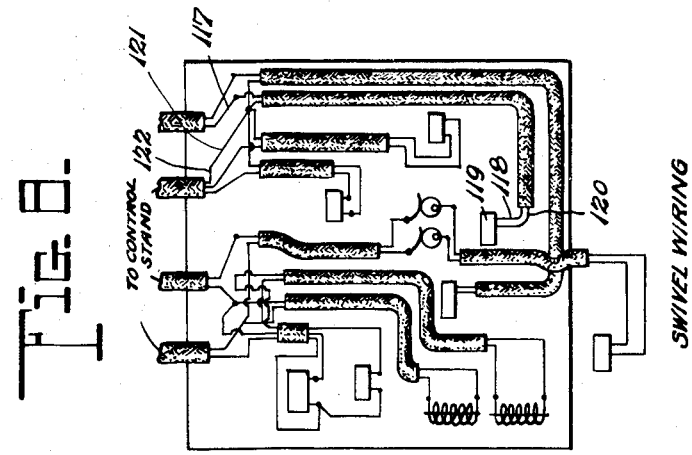
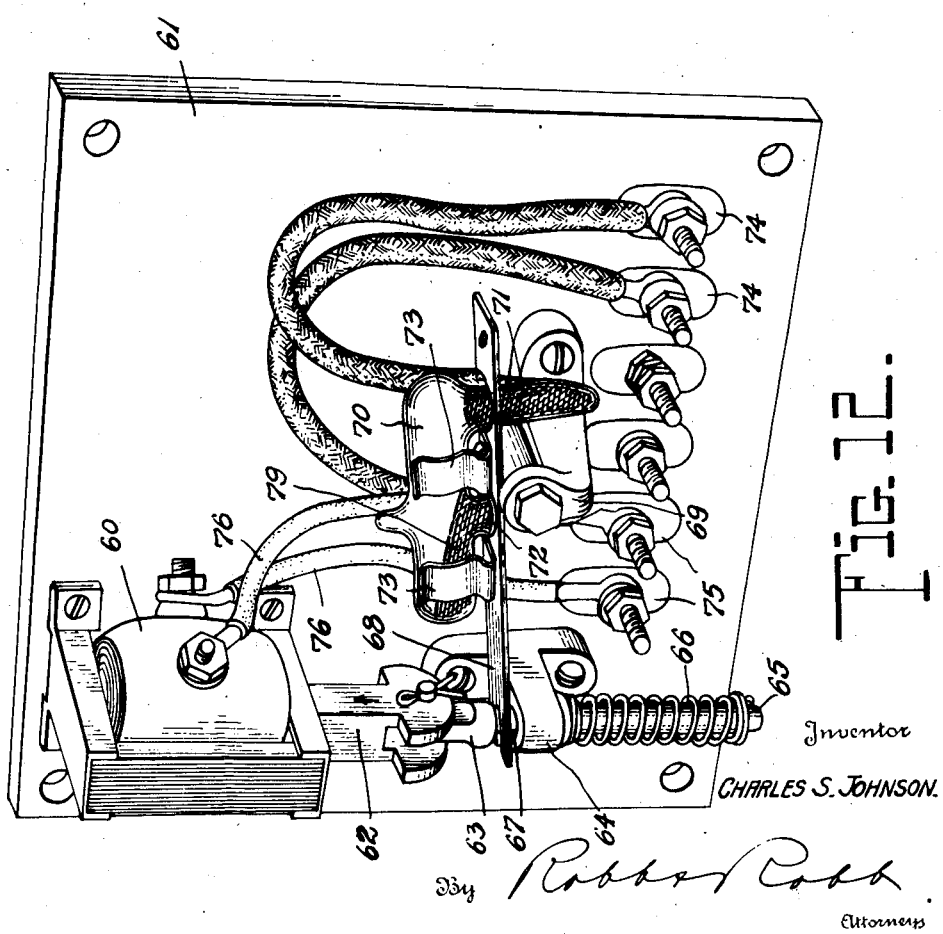
Inventor
CHARLES S. JOHNSON.
By Robert Cobb
Attorneys

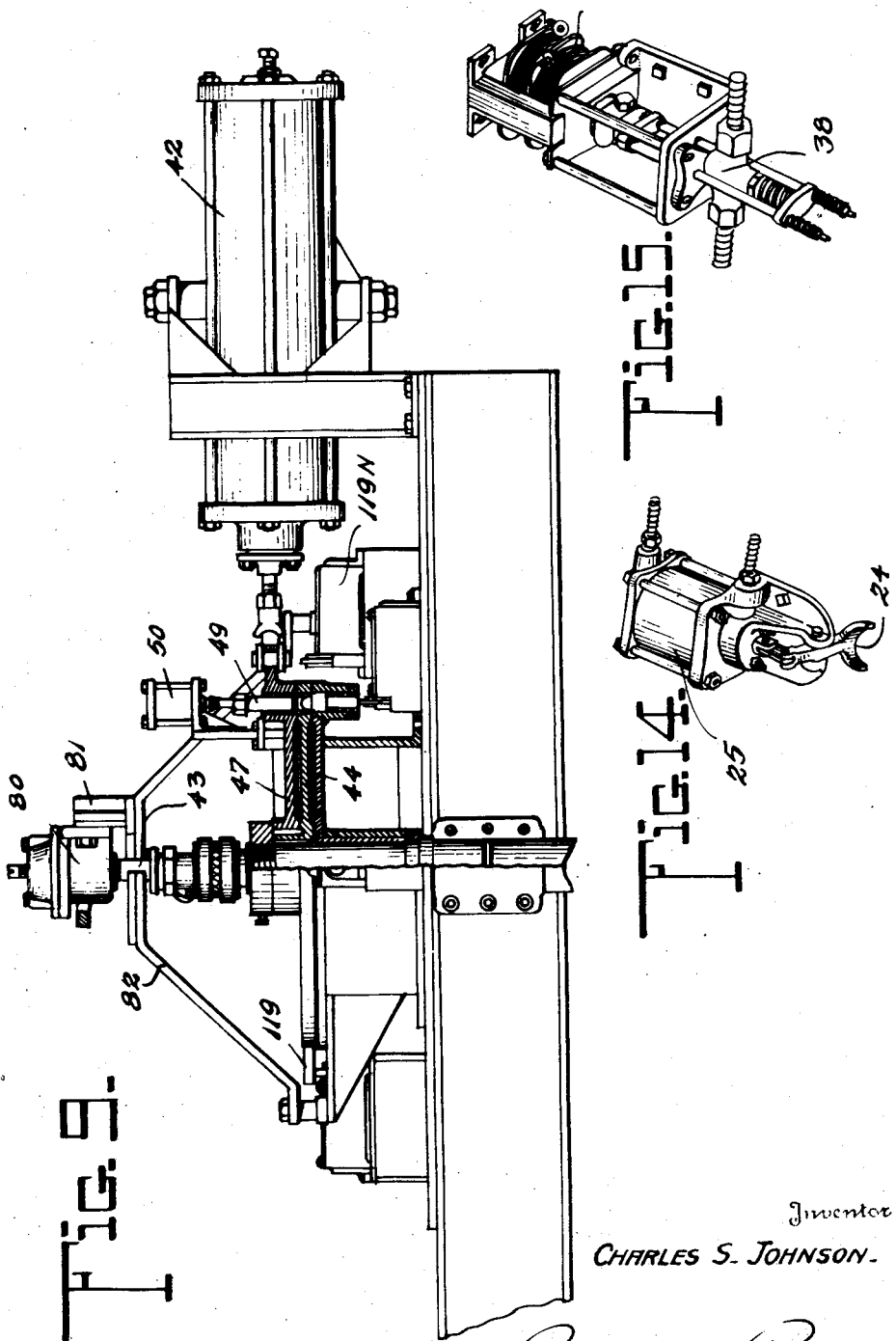

March 1, 1938. C. S. JOHNSON 2,109,534
CENTRAL MIXING PLANT
Filed June 27, 1935 12 Sheets-Sheet 8
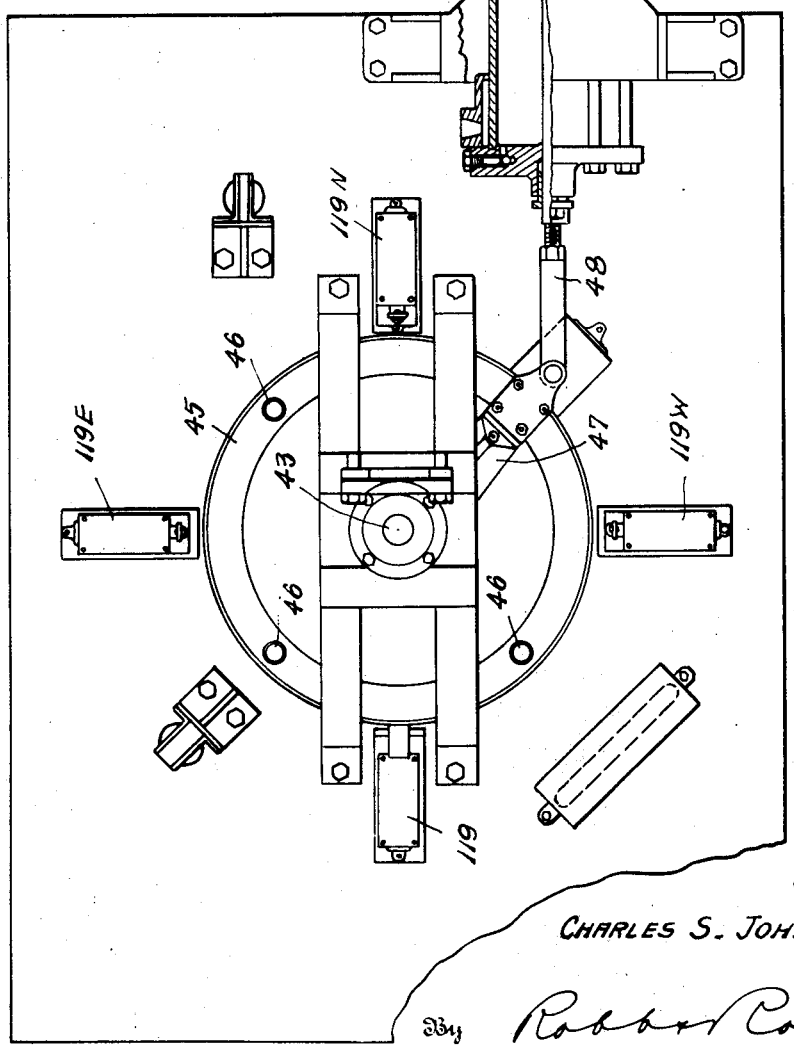
Inventor
CHARLES S. JOHNSON.
By Robert Cobb
Attorneys

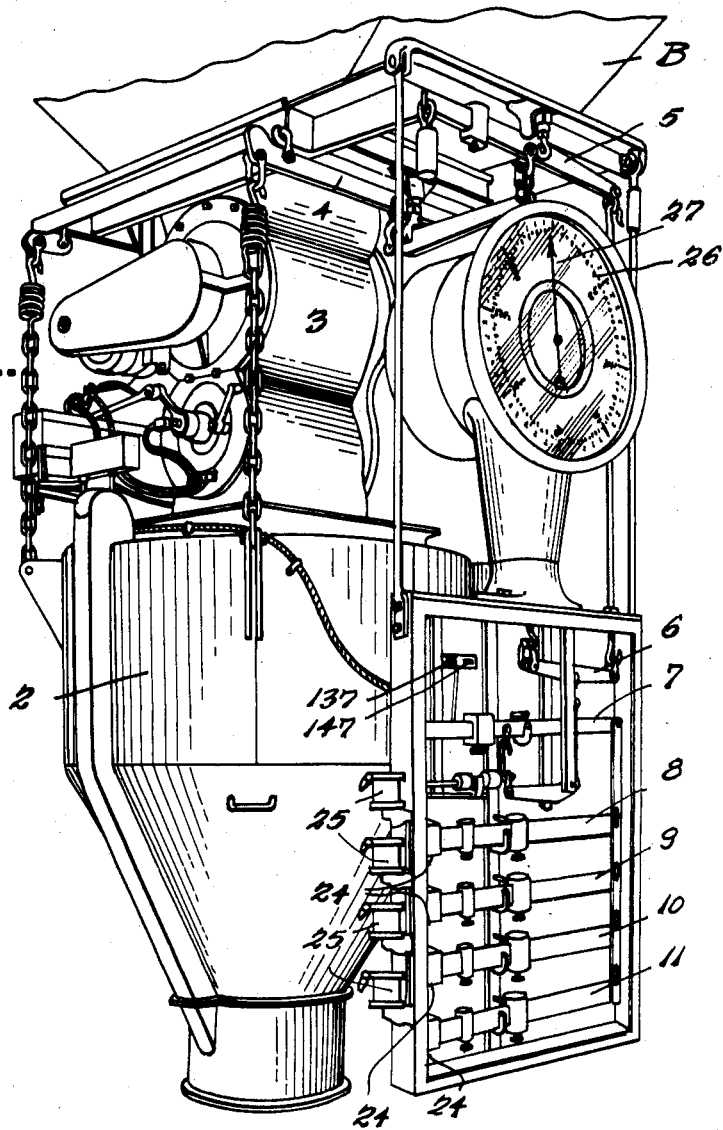

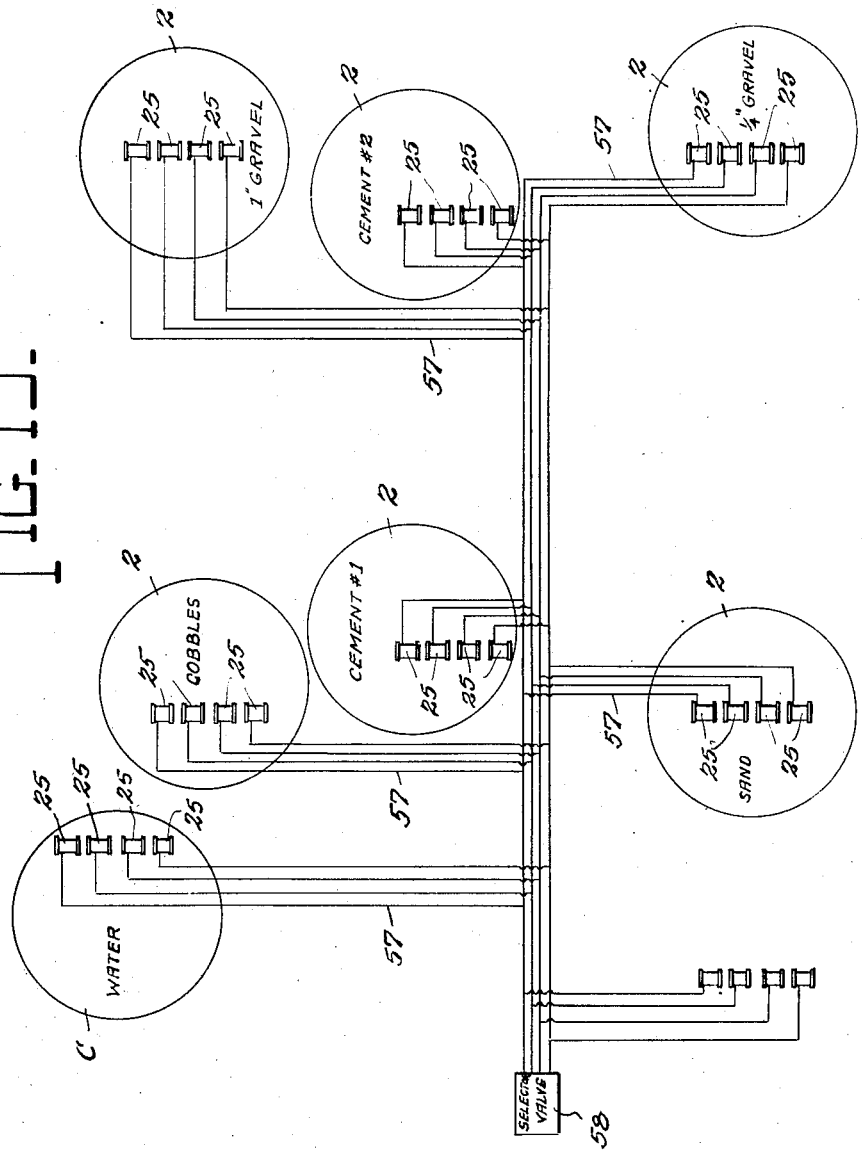

March 1, 1938. C. S. JOHNSON 2,109,534
CENTRAL MIXING PLANT
Filed June 27, 1935 12 Sheets-Sheet 11

Inventor
CHARLES S. JOHNSON.
By
Attorneys

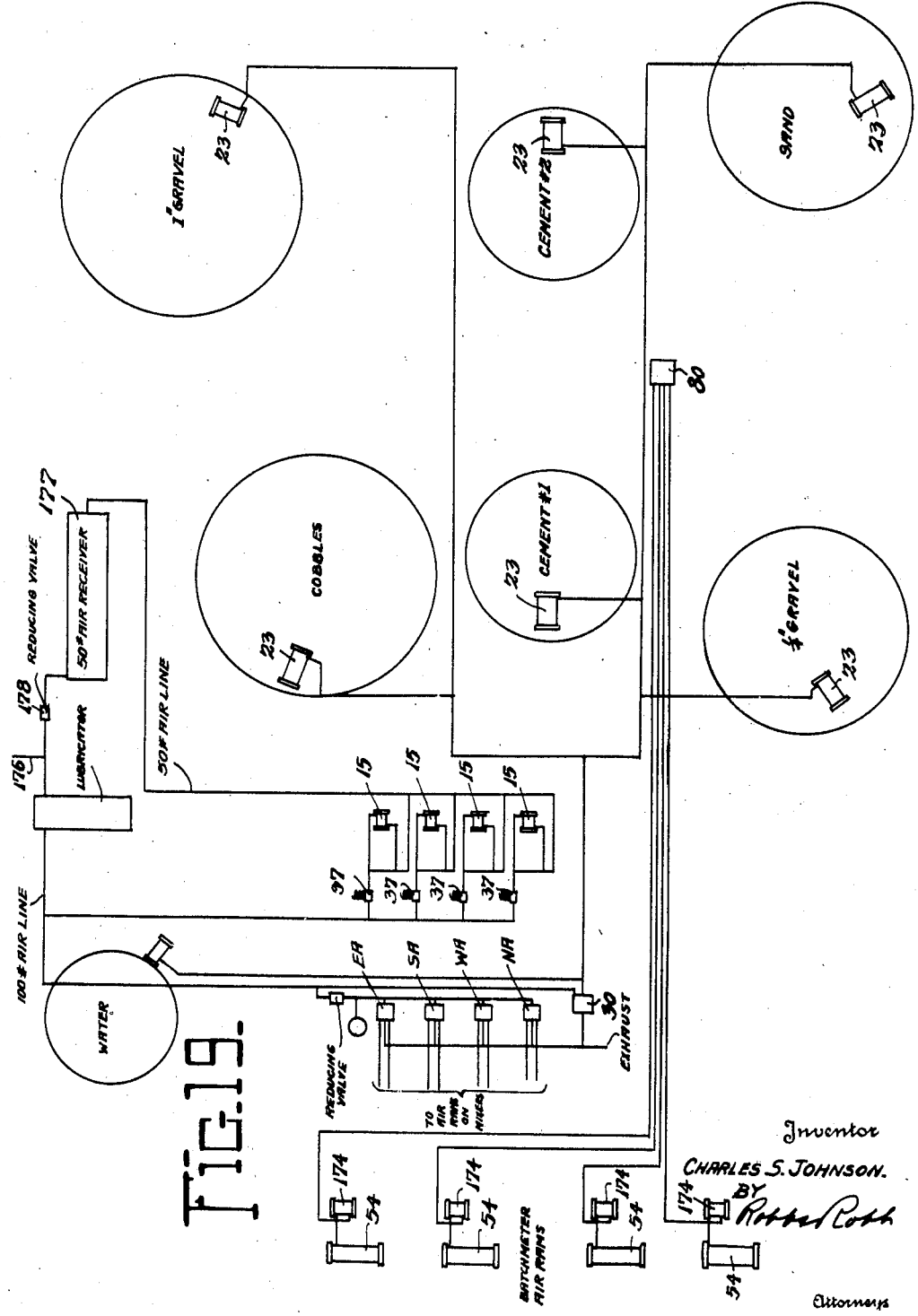

Patented Mar. 1, 1938

2,109,534

UNITED STATES PATENT OFFICE 2,109,534

CENTRAL MIXING PLANT

Charles S. Johnson, Champaign, Ill., assignor to The C. S. Johnson Company, Champaign, Ill., a corporation of Illinois Application June 27, 1935, Serial No. 28,747

34 Claims. (Cl. 83—73)

The present invention has to do with so-called central mixing plants or apparatus which are designed for the preparation of mixed concrete to be employed for the many purposes of its use today. The invention deals primarily with problems arising in the construction of such plants when designed for the mixing of huge quantities of concrete such as may be employed in the building of large dams and similar artificial masonry projects.

A mixing plant of the type referred to generally includes means for supplying a plurality of supply bins in which the aggregates for the concrete are placed preliminary to the collecting of these aggregates in batches and the supplying of the batches to the mixing unit or units for the agitation preliminary to the use of the final mixed concrete. Large projects, especially huge dam construction operations, require an enormous amount of the mixed concrete for the purposes thereof, and I have built certain central mixing plant units wherein there are associated with the supply bins for the aggregates a large number of batch weighing units, the said units being arranged to discharge into what is known as a turnhead or swivel chute adapted to carry the aggregates from the batch weighing units or batchers, to a mixer or mixers.

Now it is found further in the operation of a mixing plant such as I have described above that it is desirable to prepare mixed concrete in accordance with at least two control factors, namely, selective control of the different particular aggregates which are to go into the batch or batches to be mixed, and, secondly, control of the proportions or relative weights of the different aggregates that are to make up the particular batches.

I have designed the improvements of my present invention primarily with the foregoing and other considerations of practical operation of these plants in mind, and with a view to obtaining special coordination of the operations of the various units making up my central mixing plant, with manual and automatic controls for the several units.

In the carrying out of my invention I resort to the handling of the aggregates and the proportioning thereof by the use of separate batchers, as previously stated, one or more for each type or class of aggregate material. I utilize, as stated, a plurality of mixers for large capacity operation, four being illustrated in the embodiment of the invention hereinafter set forth. I provide novel manual and automatic controls and novel electric operating features therefor, whereby I obtain a cycle of operation of the various units of the mixing plant in proper coordination which enables me to obtain a substantially continuous flow of aggregates or materials through the plant, with accurate and variable relative proportioning of the aggregates that are selected to make up the various batches obtained in the operation of the plant. To exemplify my improvements in respect to the manner of coordinating the units aforesaid, it is noted that I provide for the initial operation of each mixer to place it in charging position or condition in regular rotation of use of the mixers for charging, mixing, and discharging. A mixer which is conditioned for charging is properly positioned to receive the unmixed aggregates from the batchers by a previous properly coordinated action of the turnhead or swivel chute which directs or carries the aggregates from the batchers to the mixer.

Now in like manner I provide means under proper control which enables the operator at the control station to select the particular batchers (weigh batching units) for the various aggregates, which batchers are to be utilized in the combining of predetermined selected aggregates that are to make up the batch to be finally mixed in the mixer. This control means is highly important because it enables batches to be readily mixed at different times under selective control, which batches are made up of different kinds of aggregates. Thus, for one batch the operator at the control station may select large stone, sand, half-inch gravel or stone, cement, and water. For the next or some subsequent batch the operator may select, by putting into action particular batchers, large stone, sand, one-inch gravel or small stone, cement, and water, and these aggregates of course will produce a mixed concrete of different nature from that obtainable from the first batch made up with a different size of stone or gravel. In the above manner I am enabled by the novel features of my invention to selectively control, as stated, the different types of aggregate materials which will make particular batches of mixed concrete that may be called for by the engineer or builder of the dam or other structure in connection with which my plant is employed, he being located at the site where the concrete is emplaced and requiring batches composed of different kinds of aggregates at different times.

In addition to the foregoing, it is notable that my weigh batch units or batchers are designed so that they may be adjusted to weigh different amounts of aggregates to make up the batch to be finally produced by the combination of the aggregates coming from the different batchers. The above end is obtained by having a plurality of weigh scale beams for each batcher, said beams adjusted for different weights of materials that are to be weighed out by the particular batcher and, according to the invention, putting the said scale beams under selective control from the operator's station, whereby the desired proportioning by weight of the different aggregates may be quickly and selectively obtained or controlled coincident with the desired selection of the different types of aggregates which are wanted to make up a particular mixed batch.

The features of my invention, therefore, residing in the provisions for obtaining the quick selective control of the kinds of aggregate materials, and the relatively quick control of the proportions (weight) of such materials to be used for each batch, constitute important developments in the particular art to which the invention relates.

In further statement of the novel coordinating features of the invention, it is noted that I employ provisions such that the discharge gates of the supply bins or receptacles which feed the aggregates to the batchers are designed to be shut off at proper times, and automatically, as each batcher weigh mechanism becomes balanced to complete the weighing of the predetermined quantity of aggregate which it is to supply as a part of the ultimate mixture handled by a mixer. Control features are provided such that the batchers cannot be discharged into the turnhead or swivel chute, by which they are carried to the mixer, until all of the batchers are balanced, or, in other words, supplied with the required quantities of materials to make up the complete batch which is to go into the mixer.

Control features are also provided according to the invention to advise the operator at the operator's station or stand, which of the batchers is being employed for the particular mix of aggregates going through the plant, so that the operator can check himself as to the correctness of the selection he has made according to the call or demand coming from the site where the aggregates are to be used. Additionally, the control features involve signalling means to advise the operator at the operator's stand which mixer is ready and in use, and that the swivel or turnhead chute is properly arranged to supply such mixer from the batchers when they are discharged into the said chute.

My invention further involves novel provisions of control or interlocking features between the different units which go to make up my plant so that there is prevented any liability of the incorrect operation of any of the units in reference to their coordination of action respecting the associated units. To the above end the invention includes novel electric circuit control features and functions as will be more fully presented hereinafter.

The means for selective control of the various batchers for operation is interlocked with control means for selectively proportioning the relative amounts of the aggregates, to render these provisions inter-dependent in the general operation of the apparatus or plant.

In the accompanying drawings one embodiment of a plant or combination apparatus comprising the principal features of the invention is illustrated, but as the presentation of the invention proceeds according to the following description it will be apparent that certain general modifications of the invention will be susceptible of adoption to accommodate for the particular conditions under which the plant is to operate. That is to say, variation in the number of grades of stone to be handled for various mixes to be produced in the plant will call for variation in the number of supply bins and weighing batchers for such portions of the aggregate materials. Likewise, such variations and others that may be resorted to may require the addition or subtraction of the number of controls and the modification of the electric circuit arrangements, dependent on the particular type of operations required for a special job.

In the drawings—

Figure 1 is a general view in side elevation of a central mixing plant embodying the invention, illustrating the general assemblage of the various provisions of such plant.

Figure 2 is a top plan view of the control stand at the operator's station.

Figure 3 is a fragmentary side elevation of the stand of Figure 2, and Figure 4 is a fragmentary end view of said control stand.

Figure 5 is a diagrammatic view of the circuit arrangements which include the various batchmeter stands and the connections thereof to the control switches on the mixers.

Figure 6 is a diagram view of the wiring of the circuit arrangements for the control stand.

Figure 7 is a view of the branch circuit wiring diagrams for the various weighing batchers.

Figure 8 is a view showing the wiring diagram of the electric circuit features by which the operation of the swivel or turnhead chute is controlled.

Figure 9 is a view in side elevation and partly in section illustrating the operating ram and associated mechanism by which the turnhead chute is shifted to establish its cooperation with a selected one of the mixers for charging the latter.

Figure 10 is a top view of the instrumentalities illustrated in Figure 9, the operating ram being shown partly in section.

Figure 11 is a general perspective view of one of the weighing batchers, a number of which are employed, one for each of the various aggregate materials that are to be mixed by the plant.

Figure 12 is a perspective view of a panel carrying one of the mercury switches and solenoid units employed in the batchmeter stands and elsewhere.

Figure 13 is a diagrammatic view of the piping arrangement for the rams which operate the beam lifters of the various batchers for the aggregate materials.

Figure 14 is a detail perspective view of one of the beam lifter operating rams.

Figure 15 is a perspective view of one of the solenoid operated air valves, of which a number are used for the purposes of the invention.

Figure 18 is another view of the batchmeter showing one of the controlling mercury switches associated therewith.

Figure 19 is a diagrammatic illustration of the piping arrangements for supplying air to the various operating rams for the discharge gates of the weighing batchers, for the air rams which operate to set the batchmeters, and for the air rams controlling the tilting of the mixers, including certain valve features and the source of pressure fluid or air supply.

*Central mixing plant construction*

Figure 16:
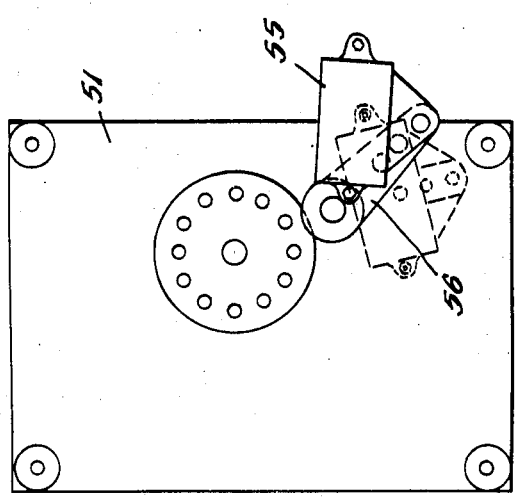
Figure 16 is a perspective view of the main batcher discharge control valve.

The general construction of my central mixing plant involves certain known arrangements including, as seen in Figure 1, a suitable framework A, at the upper portion of which are located a plurality of supply bins, seen in dotted lines and full lines and designated B. These supply bins B are designed to contain the various aggregate materials, which, according to the diagram of Figure 6, will in the present instance comprise stone of cobble size, one inch gravel, one-quarter inch gravel, sand, and cement. In order to make sure of having a supply of cement on hand two bins B for cement may be availed of, this not being material, however, to the invention. At the upper left portion of the framework A will be located a water receptacle or batcher C, in which receptacle the water may be measured by volume or by weight, dependent upon the particular requirements of the plant and the general system of proportioning the water to the aggregates, this not being a material feature of the present invention.

The supply bins B will be supplied with the various aggregates fed thereto, and maintained therein in relatively large quantities, by means of one or more conveyors, shown in dotted lines in Figure 1 at D, said conveyors leading from a suitable point, where the aggregates are brought into the plant by cars, or are stored, upwardly to an upper turnhead chute E at the top of the framework A, which turnhead chute may be shifted so as to supply a particular aggregate to its proper bin as the aggregate material is elevated by the conveyor D. If desired, the turnhead chute E may be controlled from the operator's stand designated 1 in Figure 1, or an operator may be stationed suitably adjacent to the chute E to supervise the condition of the various bins B to make sure that these bins are kept supplied with aggregate materials ready to be charged into the batchers 2 beneath the same. The batchers 2 are of the general type illustrated in Figure 11 and include hoppers adapted to contain measured quantities of the aggregates, the upper receiving ends of the batchers 2 being open and each batcher having its open end disposed beneath the discharge gate or bin valve seen at 3 in Figure 11. The details of the bin discharge gates 3 are not material, but it may be stated generally that these valves are operated by the pistons in air cylinders, hereinafter referred to as rams. Moreover, these bin discharge gates are intended to operate in fully opened positions to supply the aggregate from the associated bin to the associated batcher with a major flow, after which the gate is partially closed and intermittently moved to partially open and close it in order to establish a minor or final flow of the aggregate as the weighing of the material in the batcher approaches the balanced condition by the cooperation of a selected weigh beam cooperating with said batcher. Figure 11 illustrates in a general way that each of the batchers 2 is suspended by suitable beams 4, 5, 6, in turn connected with the scale beam 7 which is also connected for active cooperation with any one of a plurality of selective weigh beams 8, 9, 10, and 11.

It being borne in mind that the batchers 2 are arranged beneath the bins B and are adapted to be supplied with the dry aggregates accurately to be weighed in the batchers, it is noted that beneath the batchers is disposed a collector hopper 12 into which the lower discharge ends of the batchers may feed the various dry aggregates, said collector hopper 12 in turn extending downwardly and discharging into a lower turnhead or swivel chute 13, the lower discharge end of which is adapted to be turned to cooperate and feed a combined batch of dry aggregate materials from the collector hopper 12 to each one of a plurality of stationary feed chutes 14. One of the chutes 14 is associated for cooperation with the charging end of a tilting mixer. For the purposes of the plant illustrated, four of these tilting mixers are employed, the same being disposed around the central axis of the plant illustrated in Figure 1, considering that said axis passes through the center of the turnhead chute 13 and collector hopper 12.

For the purposes of this description, having in mind the directions south, east, north, and west, the tilting mixers are designated S, E, N, W. The mixers S, E, N, W are operated to tilt them to discharge positions, which is the position of the mixer S in Figure 1, by means of air rams generally designated at 15. The mixer S, after it receives a batch of dry aggregates and a suitable proportioned amount of water for admixture therewith, will be discharged after a proper, elapsed mixing time incident to its rotation, into the lowermost hopper 16, which wil be termed the mixed concrete hopper hereinafter, and the hopper 16 is equipped with a discharge gate 17 operable by a suitable air ram 18 so that the contents of the hopper 16 may be discharged into cars, receptacles, or onto a conveyor 19, see Figure 1, this being immaterial to the invention. If desired, an overload control means of any suitable type, generally illustrated at 20 in Figure 1, may be provided to close the gate 17 should an overload of mixed concrete be received on the conveyor 19.

The water for admixture with the dry aggregates supplied to a predetermined mixer may be fed from the water batcher C through suitable piping 21 and a lateral extension pipe 22, the lower end of which is disposed above the upper open end portion of the lower turnhead chute 13 so as to supply the water to said turnhead chute in all positions assumed by the latter for cooperation with a selected one of the mixers S, E, N, W.

Now of course the batchers 2 are arranged in a suitable battery about at the position shown in Figure 1, and the operator's control stand is preferably located on the same elevation of the plant as the battery of batchers 2. While the battery of mixers comprises four of these machines, it will be understood that an enlargement of the capacity of the plant may be obtained by increasing said number, or a reduction in the capacity may be obtained by reducing the said number. The various mixers are of a known type, namely the tilting type, are adapted to be rotated constantly when the plant is started in operation, and will be tilted to their discharge positions and restored to their righted non-discharging positions while in rotation.

With the foregoing general idea of the plant construction in mind, before specifically describing the details of the controls and actuating means for the various parts, it may be noted that the operator at the control stand 1 will so control the operation of the main plant instrumentalities subject to interlocks for maintaining the proper operations of the various features of the plant to accomplish the following order of operation.—The dry aggregates will be supplied to the various batchers 2 which are selected by the operator to be used. In other words, the operator being ordered to supply or cause to be mixed for the site of emplacement of the concrete a batch which comprises certain of the dry aggregates only, preselects the batchers 2 which are to go into operation. The water is suitably batched according to volume or weight in the batcher C therefor. When the batchers 2 are filled with the required weights of dry aggregates and the batcher C is supplied with the proper weight or volume of water for admixture therewith, the bin gates 3 that supply the batchers 2 are closed and the water supplied to the batcher C is likewise cut off.

The aggregates and water measured in the batchers 2 and C pass to the collecting hopper 12 under the control of suitable discharge means, and an interlock is provided such that the discharge gates for the bins B must be closed before the discharge gates for the batchers 2 can be opened. In like manner the reverse control is provided such that the discharge gates for the batchers 2 must be closed before the gates for the bins B may be opened.

Additionally, it is contemplated that control means shall be provided to ensure that the turnhead chute 13 is properly positioned in respect to a selected one of the mixers S, E, N, W to be charged before the discharge gates for the batchers can be operated to charge the selected mixer. Again, the mixer selected to do the mixing of a particular batch is controlled so that it must be in its proper charging position and in rotation of order of use with respect to the other mixers before the charging operation for such mixer can be accomplished. The selection of the particular mixer to be put into use involves additionally a control such that its particular batchmeter only will be rendered operative when the charging of the mixer from the aggregates batchers is caused. The opening of the discharge gates for the batchers initiates the action or setting into operation of the selected batchmeter for the mixer which is to do the mixing in regular order of rotation. Of course the batchmeters in themselves control the maintaining of the mix in a particular selected mixer for the elapsed time required for the proper mixing.

By the foregoing controls and interlocking phases of operation of the parts of the plant, a uniformity of mixture of batches of concrete is produced, the variation in the nature of the batch as to the kind of aggregates contained may be accomplished, and by employing selected weigh beams of each batcher for the dry aggregates, a variation of the proportions of the dry aggregates for a particular batch to be mixed is obtainable as previously outlined in the objects of the invention stated herein.

Weighing batchers

The weighing batchers have been generally described before in conjunction with Figure 11, and it is notable that these batchers employ a plurality of the weigh beams 8, 9, 10, and 11, a selected one of which may be thrown into action for the control of the amount of dry aggregate to be handled by the batcher 2. While four of the weigh beams 8, 9, 10, 11 are illustrated in Figure 11, a larger or smaller number of these weigh beams may be availed of, depending upon the extent or range of proportioning of the aggregates in the concrete mixture required for the construction that is to be erected from the mixed concrete produced in my plant. Generally speaking, the batcher unit shown in Figure 11 may be of a known type at present used. The discharge gate of each batcher 2 is ram operated, as previously stated, the rams being shown at 23 in Figure 1. Only one of the weighing beams 8, 9, 10, 11 is used at one time for each weighing operation by the batcher. Normally the said weigh beams are inoperative because of the use of weigh beam lifters 24, shown in Figure 14, said lifters 24 being operated by air rams 25 to shift the lifters to an inactive or release position. In other words, if the operator wishes to weigh in the batcher 2 an amount of dry aggregate by the balancing of the weigh beam 9, which we will say is set for 1,000 lbs. weight, suitable means at the control stand enables the operator to select the weigh beam 9 for use by causing air to pass to the ram 24 associated with said weigh beam to move the lifter or beam to a release position, thereby to cause said beam to control the amount or weight of material received in the batcher 2 when the latter is balanced with the beam. An auxiliary weighing scale comprising the dial 26 and pointer 27 may be availed of so as to visually indicate to the operator the amount of aggregate received in the batcher with which this dial and pointer scale are connected.

Operator's control stand

The operator's control stand 1 of Figure 1 is shown more in detail in Figures 2 to 4 inclusive and may now be generally referred to in order to understand the main control instrumentalities used in conjunction with the various parts of the plant that have been previously generally set forth as to their cooperation.

Referring to Figure 2, there is illustrated at the top of the control board a series of switches 28 which are employed for selecting the particular batchers 2 that are to receive aggregates for the combined batch of mixed concrete to be mixed in one of the mixers S, E, N, W. Thus, according to the showing of the invention, if the batch of concrete is to be composed of cobblestone, ½" gravel, ¼" gravel, sand, cement, and water, the first, third, fourth, fifth, and seventh of the switches 28, as seen in Figure 2 and as seen in the diagram Figure 6, will be closed for the pre-selection of these batchers for action. The control board at the station 1 carries light signals 29 adjacent to the switches 28 and when the switches are closed the light signals are illuminated, showing the operator which ones of the batchers 2 are selected for operation. These light signals remain illuminated until the batching operations in the batchers are completed, whereupon the signal lights go out. On the control board at the station 1 the operator has access to a main discharge control valve 30 designed to be manually operated by the operator for causing the air rams 23 of all of the batchers 2 to be operated at the proper time, but said valve 30 cannot be actuated by the operator at the station until the weighing operations in the batchers 2 are completed and the various other parts of the apparatus are conditioned to work in their regular rotation of action, because of the provision of a lock pin 31, see Figure 3, which normally locks the said control valve 30 from operation; see Figure 16 for the showing of the valve 30 and its lock pin 31, the latter being operable by a solenoid 32 and being adapted to engage in an opening 33 of an abutment carried by the axis of the valve lever 34. The solenoid 32 is included in electric circuit connections to be hereinafter described.

On the control board aforesaid there are provided a series of mixer tilt valves which are designated SA for the mixer S, EA for the mixer E, NA for the mixer N, and WA for the mixer W, and the said tilt valves control the passing of air into air cylinders or rams 15 of the mixers S, E, N, W in order to at the proper time cause the discharge tilting movement of the mixers in their regular rotation of use. If it is desired to operate the mixers S, E, N, W for controlling their tilting movements and the righting of the mixers to their charging positions, automatically, then control switches 35, seen above the tilt valves in Figure 2, may be turned from their positions as shown in Figure 2 in a clockwise manner to the positions 36. Thus it is possible to employ the control features of the invention for obtaining either a manual tilting and restoration of the mixers or an automatic tilting and restoration, dependent upon the adjustment of the parts.

When the operations of tilting and restoring the mixers are to be performed automatically, the solenoid operated air valve mechanism of Figure 15 is put into use. The unit of Figure 15 comprises the solenoid 37 arranged to actuate an air valve in the air valve casing 38 so as to control the passing of air to the air rams 15 and the cutting off of such air in the same manner as would be performed by the manual valves SA, EA, NA, WA, all as will be set forth hereinafter in reference to the electrical circuit wire diagram of Figure 6.

On the control board at the station 1, below the tilt valves above mentioned, are light signals 39 and 40 for each mixer. The signal 39 when illuminated shows that the batchmeters have released and the mixer is ready to be moved to discharge position; the signal 40 is illuminated after the mixer has been moved to discharge position and subsequently moved to charging position. Upon the control board there will also be provided control equipment parts for accomplishing certain other operations as may be needed for the successful completion of specific cycles of the action of the various parts of the plant, but which do not affect the provisions of the present invention.

On the control board at the station 1 there is provided the switch button 41 for the control of the operation of the swivel or turnhead chute 13. By operating the switch member 41 the operator at the station 1 is able to control the admission of air to the air ram 42, see Figure 10, for causing actuation of the turnhead chute 13 to bring it to a position for cooperation with a particular one of the mixers S, E, N, W. The control means for the turnhead chute will now be set forth in more detail.

*Mixer charging lower turnhead chute*

The turnhead chute 13 is mounted on the shaft 43, see Figures 9 and 10. On the shaft 43 is fixed a spider 44 including the ring member 45, which ring member, as seen in Figure 10, is equipped with four openings 46, one for each of the tilting mixers S, E, N, W. That is to say, the member 44—45 is adapted to be shifted intermittently and progressively to bring the swivel chute 13 discharge portion over the stationary charging chute 14 of each mixer. Therefore, according to the present showing, it is desirable to advance the chute 13 rotatively and progressively so that it may successively charge each mixer S, E, N, W. For this purpose there is loosely mounted upon the shaft 43 above the spider and ring 44—45 an actuating arm 47 capable of being actuated by a rod 48 attached to the piston of the air ram 42 which moves the said chute 13 under proper control. For connecting the arm 47 to the ring 45 there is provided a lock pin 49, see Figure 9, which lock pin is adapted to be projected, by an air ram 50, from the arm 47 into one of the openings 46 of the ring 45 for the purpose of effecting a forward rotation of the member 45, shaft 43, and chute 13, the movement being approximately 90° to bring the discharge portion of the chute 13 opposite the receiving end of a predetermined one of the mixers S, E, N, W. Upon return of the arm 47 by a reverse action of the ram 42 the lock pin 49 will have been previously withdrawn from the opening 46 of the ring 45 to release the member 44 and the shaft 43 so that the chute 13 may remain stationary as the arm 47 resumes its normal position ready to cause a second progressive movement of the chute 13 to bring the same opposite the next mixer to be served by the batchers.

*Batchmeter details*

Figure 17:
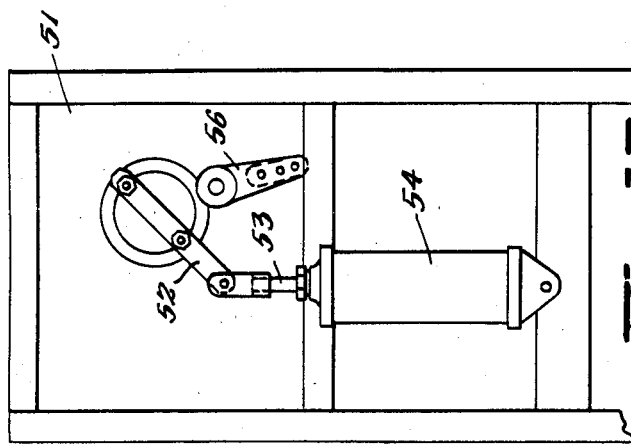
Figure 17 is a diagrammatic view of one of the batchmeters for each mixer, illustrating the manner in which the air ram is connected to set the batchmeter into action.

The batchmeter used in accordance with this invention may be of any known type and may be positioned as shown in Figure 1 where these instruments are designated 51 as positioned near the operator's stand 1 and the control board previously described. The batchmeters may be of a type such as set forth in Winkler Letters Patent No. 1,451,483 issued April 10, 1923, but the operation of setting the batchmeter according to this invention will be effected differently than presented in said Letters Patent. The setting arm 52 of each batchmeter, one being provided for each mixer S, E, N, W, is connected with the actuating or piston rod 53 of an air ram 54, see Figure 17. Admission of the air to the ram 54 will cause its piston to move the setting arm 52 of the batchmeter and start the batchmeter into operation for controlling the elapsed time for the mixing of the concrete in the mixer with which the batchmeter is associated.

Figure 18 shows associated with the batchmeter 51 a mercury switch 55 mounted on the release lever 56 of said batchmeter, and the action of this mercury switch in opening and closing will be more fully set forth in conjunction with the electric circuit including said switch, as later described herein.

*Weigh beam selector control*

Referring to Figure 11 and the weigh beams 8, 9, 10, and 11 which have been described as capable of being lifted so as to be rendered inoperative and released to put them in action, through the provision of the beam lifters 24, reference is made to the diagrammatic view in Figure 13 which illustrates the various batchers 2, the four rams 25 associated with the four weigh beams of each batcher, and including the batcher C for the water, which is similarly equipped for supplying different amounts of water to the mixers. The view in Figure 13 is the pipe line arrangement, the pipe lines running to the various rams 25 being designated 57 and the passage of the pressure fluid through these pipe lines being under control of a beam selector valve 58 which is shown on the control board of the operator's stand 1 in Figure 2. This beam selector valve 58 is provided with a manually controllable lock pin 59 to lock it in different beam selective positions and is otherwise manually controllable by the simple release of the said lock pin.

Solenoid operated mercury switches

Figure 12 illustrates a solenoid mercury switch, a plurality of which are used for controlling certain operations as will become more clearly understood later on in connection with the description of the electric circuits for controlling the various instrumentalities of the central mixing plant. The solenoid operated mercury switch illustrated in Figure 12 comprises a solenoid 60 mounted upon a base or panel 61, which is provided with a core 62, one end of the core being connected to a rod 63 slidably mounted within a bracket 64. The opposite end of the rod 63 carries a retaining washer or the like 65, and a coil spring 66 is interposed between said retaining washer 65 and bracket 64 as clearly shown in Figure 12. The rod 63 is further provided with a portion 67 of reduced diameter for engaging a switch actuating member 68 movably mounted upon a bracket 69. The switch actuating member 68 carries the mercury switch 70 which comprises contact portions 71 and 72. The switch 70, which may be of usual commercial construction, is secured to the switch operating member 68 by means of clamp members 73. Terminals 74 are provided for interconnecting the switch 70 with the circuit in conjunction with which they are to be used, while terminals 75 are connected, by means of conductors 76, with the solenoid 60 to provide a means for supplying current to said solenoid for operating the same. Upon operation of the solenoid 60 the core 72 will be actuated in the direction shown by the arrow in Figure 12 and the switch actuating member 78 will be raised, thereby tilting mercury switch 70 and the mercury 79 within its glass body will close the respective circuit to which the switch is connected by bridging the switch terminals 71 and 72.

Batchmeter selector control means

The shaft 43 of the lower turnhead chute is provided with a batchmeter selector valve 80 for selecting the associated batchmeter of one of the mixers S, E, N, W so as to connect the proper batchmeter for operation which controls the operation of the mixer to be used. In other words, when the lower turnhead chute 13 is in position to discharge the contents from the batchers into the mixer S, the batchmeter selector valve is operated to connect the air line connections of the air ram which performs the setting of the batchmeter associated with the mixer S so that the same may be rendered operative to time the mixing period for the mixer S upon opening of the gates of the batchers to discharge the weighed aggregates into the mixer S. In like manner the batchmeters associated with mixers E, N, and W are selected when the turnhead chute 13 is in proper position for charging the same. The batchmeter selector valve 80 is mounted, by means of a bracket 81, upon a frame structure 82 which forms a part of the lower turnhead chute frame construction. The inner rotatable part of the batchmeter selector valve not shown is adapted to connect the pipe lines leading to the air rams of the various batchmeters to effect the operation of the same in a manner as outlined above and as will be later more fully described.

Central mixing plant operation

In the foregoing I have described the general construction of my central mixing plant and the construction of the various parts thereof which are employed for controlling the operation of the same.

Setting forth now a complete cycle of operation of my plant, it may be indicated at the outstart hereof that the conjoint action of the control instrumentalities and the controlled devices which are adjuncts of the plant or apparatus is obtained by employing electrical connections largely between the said various instrumentalities and devices. An understanding will be had of the various main and branch electric circuits, including the controlling and controlled instrumentalities, from the following explanation of the full cycle of operation of my mixing plant since in my description I refer specifically to the various circuit features. In order to most clearly comprehend my invention in its operation I shall start the cycle beginning with the raising or righting of the mixer S (south mixer) to its charging position. Just previous to such operation of the mixer S in restoring it to its charging position the following conditions of the various instrumentalities exist.

Assuming that all of the individual motors for the several mixers S, E, N, W have been put into operation, they are considered as under constant rotation while the plant is being used for its purpose. It is additionally assumed that all mixers are in their tilted discharging positions and the the rotation of the mixers is continued while they are being charged, while they are being tilted, during discharging, and during restoration to their original charging positions.

Now starting with the mixer S, a cycle of operation may be set forth as follows: The mixer tilting valve SA at the operator's station 1 is moved to cause righting or return of the mixer S to its charging position as shown in Figure 1 and the mixer S is now ready to receive a batch of properly selected and properly proportioned aggregates. The righting of the mixer S to its charging position causes the light 40 to signal the operator that the said mixer is ready to receive a batch.

The switch button 41 for the turnhead chute 13 is pressed by the operator and the chute is moved by its ram 42 so as to bring the mixer charging portion of the chute in line with the mixer S and the stationary chute 14 thereof.

On each of the mixers, including the mixer S, are carried mercury switches 83 and 84, see Figure 1, and the diagram of Figure 5. Upon the movement of the mixer S to its charging position the mercury switches 83 and 84 are operated in such a manner that current will be supplied to one terminal 85 of the solenoid 32, which solenoid controls the lock pin 31 for said main discharge valve 30. The current flow to the terminal 85 of solenoid 32 is from one side of the power line 86, as shown in the diagram of Figure 5, and passes over wires 87 and 88 to one terminal 89 of the solenoid 90, which is of the type shown in Figure 12 at 60; also the current flows from said power line 86 over circuit wire 91 to one terminal of the signal light 39, see Figures 6 and 2. The main circuit or power line 86 of Figures 5 and 6 is the same line. The solenoid 90 cooperates with the switch 92, and to energize said solenoid 90 current must be brought from the other side of the power line, indicated by 93.

It is to be understood that the diagrams of electric circuits and associated parts as shown in Figures 5 and 6 are now being referred to in respect particularly to the branch circuits which cooperate with the mixer S, which is now being set forth as to its function in the particular cycle at present described. Other similar branch circuits and associated electrically operated parts are provided for mixers E, N, and W, so that a description of one of these branch circuits with the connections and adjuncts thereof is equally applicable to all of such circuits for the operation and control of the various mixers.

The current, as stated above, must be brought from the side of the power line indicated 93, as previously mentioned, in order to energize solenoid 90. and therefore the current flows over wire 94, wire 95, through switch 96 to wires 97 and 98, to terminal 99, said terminal 99 being one terminal of the said switch 92. The current also flows over wire 100 to one terminal of the mercury switch 83 mounted on the mixer frame as previously referred to, and also shown in Figure 1. It is noted that when the mixer S was previously in its tilted position the switch 83 was closed and the switch 84 was open.

Before the raising of the mixer S the current flows through switch 83 over wires 101 and 102 to terminal 103 which is the other terminal of the solenoid 90 previously referred to. Thus while the mixer is in its tilted position, solenoid 90 is energized and closes cooperating switch 92, thereby permitting current to flow from terminal 99, through the switch 92, over wire 101, to terminal 103. but the current is inactive at this point until further operations take place. The current flow, however, as set forth, holds the switch 92 closed until the switch 96 is opened in proper sequence of operation. Reverting, as the mixer S begins to right, the switch 83 on the mixer frame opens. However, the switch 92 remains closed due to the current flow as previously described.

The mixer S has now completely righted and reaches its charging position, thereby closing the switch 84 on the mixer frame, causing the current to flow over wire 101, through the switch 84, over wires 104, 105, and 106, to one side or terminal of switch 107. Solenoid 108 is normally energized while the mixer S is rotating, thereby causing the cooperating switch 107 to close. Should it happen that the mixer S is not rotating, the solenoid 108 is not energized, thus causing the switch 107 to remain open. If the current is not passing through the switch 107, or in other words, the mixer S is not in rotation, the mixer cannot be charged until such time as said mixer is put into rotation. In this manner the circuit connections afford a safety provision since it is impossible to charge any of the mixers when they are not in operation for agitating purposes. The electric circuit for the motor which operates the mixer is therefore interlocked with the control mechanism of the plant such that there is no liability of charging the mixer when it is not in rotation.

We have assumed that the mixer S is rotating, however, and the solenoid 108 is energized to maintain the switch 107 closed. Under these conditions the current flows through the switch 107, over wires 109 and 110, to wire 111 of the control stand circuit, Figure 6, thence to wire 112 and wire 113, to the opposite terminal of the light 39, previously mentioned. The light 39 is now illuminated and indicates that the mixer S is empty and has been restored to charging position ready to receive a charge. At this time the current flows also from wire 112 to wires 114, 115 and 116, and on over wire 117 of the swivel turnhead chute control circuit as shown in Figure 8. From the wire 117 current flows over wire 118, to one terminal of the switch 119, see Figure 8. The switch 119 is shown in Figure 9. When the turnhead chute 13 is in line with the mixer S the switch 119 is pressed closed and this permits the current to flow through the switch 119, over wires 120, 121, 122, to wire 123 (see Figure 6) of the control stand circuit. The current flows also over wire 124 to the terminal 85 of the solenoid 32 for the main discharge control valve 30 previously referred to.

At this point it might be mentioned that there are provided four turnhead chute switches 119 (see Figures 9 and 10), one switch for cooperation with the turnhead chute 13 in each of its positions wherein it will charge one of the four mixers S, E, N, W. The switch 119 will cooperate with the mixer S, the switch 119E with the mixer E, the switch 119N with the mixer N, and the switch 119W with the mixer W. The switches 119, 119E, 119N, 119W operate in proper sequence upon the rotational adjustments of the chute 13 in positions to cooperate with the several mixers in the regular order stated.

One side of the electric circuit as thus far described has been completed to the solenoid 32 which controls the operation of the lock pin 31 of the discharge valve 30, but the movement of the lock pin will not be affected because the solenoid is not energized until the selected batches have been fully weighed in the batchers 2 which are to supply the aggregates for the mixed batch of materials that go into the mixer S. It is the operation of all of the selected batchers 2 to assume their balanced positions which controls the other side of the circuit which energizes the solenoid 32 and the release of the valve 30 from the lock pin 31. This other side of the circuit will now be described.

Mercury switches designated in circuit diagram of Figure 6 as 125, 126, 127, 128, 129, 130, 131, are located within the operator's control stand 1, and when these switches are all closed the solenoid 32 for the main discharge valve 30 becomes energized because the other side of the circuit to said solenoid is closed under such conditions. The energizing of the said solenoid releases the lock pin 31 for the said discharge valve 30 and enables the operator to manually actuate the said valve 30 whereby to cause air or pressure medium to pass to the rams 23 of the batcher 2 to open the discharge gates thereof and cause the aggregate materials in the batchers 2 to pass to the collecting hopper 12 and chute 13 and thence to the mixer S or whatever mixer is in position for use. The closing of the mercury switches 125 to 131 inclusive is effected when the weighing mechanism of each batcher 2 is in balance, this condition being created by the admission to the batchers of the predetermined quantity of materials which will be weighed up and supplied by the batchers for mixing in the mixer. The specific operation, which includes the accomplishment of the closing of the said switches 125 to 131 inclusive will be referred to hereinafter.

Reverting to the selector switches 28 shown in Figure 2 and in Figure 6, it is noted that these switches are manual and they are selected to be closed for the purpose of selecting the particular batchers 2 which are desired to be put into operation for supplying to the mixer the particular aggregates that will be weighed therein and which are desired to be collected to make up the batch of concrete to be mixed in the pre-arranged mixer. Assuming that certain of the switches 28 have now been closed for the selection of the batchers 2 which are to weigh up the selected aggregates which will comprise the desired mix, the operation resulting from the closing of the switches 28 will now be set forth. Since all of the batcher units are selected and put into operation in the same manner so far as the closing of the circuit connections are concerned, it will suffice for this description to describe the action of the closing of one of the circuits by one of the switches 28. The operation of the batcher unit for the ¼" gravel, by the throwing of its switch 28 to closed position will be set forth.

Closing of the said switch 28 renders its associated batcher 2 operative. (It is assumed that the said batcher 2 for the ¼" gravel is empty and therefore the weigh beam which is to balance said batcher when loaded or charged, which may be any one of the weigh beams 8 to 11 illustrated in Figure 11, is out of balance). After closing the switch 28, the current flows, as indicated in Figure 6, from one side 93 of the power line, through one side of the said switch 28 (previously closed manually as noted) and on over wire or line 132, Figure 6, to the batcher control circuit shown at the right end of Figure 7, and in said circuit over the lines or wires 133, 134, 135, 136, through switch 137 (which switch is closed because the weigh beam is out of balance), then from switch 137 over wires 138, 139, 140, back to the control stand 1 over wire 141. The current flowing over the wire 141 will flow to one terminal of the signal light 29 of the batcher for the ¼" gravel and at the same time said current will be supplied to the solenoid 143 which is associated with the switch 127, previously mentioned.

Now current must be supplied from the opposite side 86 of the power line to the opposite terminal of the batcher signal light 29 and the solenoid 143 with the cooperating switch 127 over wires 144, 145, and 146.

The batcher signal light 29 is now lighted and the solenoid 143 is energized, thereby opening the cooperating switch 127. As soon as the weigh beam or scale associated with the one-quarter inch gravel batcher now being described comes to balance, the switch 137 is caused to open, thereby interrupting the flow of current and causing the signal light 29 to go out, at the same time deenergizing the solenoid 143 and closing the cooperating switch 127. As previously mentioned, the closing of the selected switch 28 for the ¼" gravel batcher renders this batcher operative, it being at such time out of balance. The unbalanced condition of the weigh beam of said batcher causes the switches 137 and 147 to close. The switch 147 controls the major stream flow into the batcher 2 while the switch 137 controls the final stream of flow into the said batcher. It will be borne in mind that the switch 137 also controls the batcher signal light 29 and the solenoid 143, as previously set forth. Since the lock pin 31 is still in locking cooperation with the main batcher discharge control valve 30, the batcher discharge gates at the lower ends of the batchers 2 are closed and therefore the switch 148, see Figure 7, is caused to be closed. It is thereby understood that one of the switches 148 is carried by the gate of each batcher.

The conditions of the parts being as stated above, beginning at one side 86 of the power line, current flows through the switch 28, which is closed, over 144, over wires 149, 150, through switch 148, over wire 151, on to one terminal of the solenoid 152 and over wire 153, to one terminal of the cooperating switch 154. Now current must be brought from the opposite side 93 of the power line in order to energize the solenoid 152. The current therefore flows from the side 93 of the power line, through switch 28, over wires 132, 155, to one terminal of the solenoid 156 which operates the bin valve of the respective bin above the ¼" gravel batcher 2. Current also flows from wire 133 over wires 134, 135, and 157, through switch 147, over wires 158, 159, to the opposite terminal of solenoid 152, causing the latter now to be energized and closing the cooperating switch 154. The current now flows from wire 153, over switch 154 and wires 160, 161, to the other terminal of solenoid 156 for the said bin valve. This energizes the said solenoid which is associated with the bin valve 3 of the ¼" gravel batcher 2, see Figure 11, causing the air ram which actuates the said bin valve to open the valve and supply the aggregate in the bin above the one-quarter inch gravel batcher to said batcher. The aggregate starts therefore to feed into the batcher 2 and the batcher begins to balance its selected weigh beam.

The switch 147, as previously suggested, is the mercury switch which controls the major stream of the aggregate flowing from the bin above the batcher 2 into the batcher, and this mercury switch is so adjusted that it will open when the weigh beam previously employed selectively begins to balance; the object here is to enable the aggregate to flow in a comparatively large stream into the batcher 2 until the weigh beam is nearly balanced, and then cut the major stream or flow down to a final or minor flow stream, which will be definitely cut off when the batcher and its weigh beam are nicely and fully balanced with the right weight of material in the batcher. Therefore, when the weigh beam, as stated, begins to balance, the switch 147 automatically opens under the actuation of the weigh beam itself because the switch is connected operatively with all the weigh beams and can therefore be actuated by the selected weigh beam which has been put into action for the particular batching operation. The automatic opening of the major stream mercury switch 147 causes current to flow from wire 135, over wire 136, through the switch 137, to wires 138, 139, over wire 162, through the switch 163. The switch 163 controls the bin valve 3 for filling the batcher so that said bin valve can only partially open and thus cause the final minor stream flow of the material referred to above. Now the current flows from the switch 163, over wires 164, 159, and this in turn energizes the solenoid 152 which in turn energizes the solenoid 156 for the valve which admits air to the ram that operates the bin valve above the batcher 2.

It must be understood that I am now referring to a second energizing of solenoids 152 and 156. The first energization of the solenoids was controlled by switch 147, but in view of the fact that switch 147 has now been opened to discontinue the major flow control of aggregate, further energization of the solenoids 152 and 153 is maintained under control of the final flow control switch 137.

The switch 163 will interrupt current intermittently in order to keep the bin valve 3 in partially opened position, by which action the minor flow is maintained. Now when the weight of the aggregate material which has flowed into the batcher 2 comes to true balance, the switch 137 is also automatically opened, thereby to interrupt all current flow, and this in turn closes the bin supply valve 3 for the batcher 2 completely, and cuts off all further feed of aggregate to the said selected batcher of the ¼" gravel. When the switch 137 opens in the manner stated, the solenoid 143, see Figure 6, is de-energized and the cooperating switch 127 thereof is closed, as described previously. The closing of the switch 127, and all of the other corresponding control switches 125 to 131 of the batcher units which have been selected for operation, is necessary before the main discharge control valve 30 for the discharge gates of the batcher will be unlocked and susceptible of manual operation.

I have only described for the purposes hereof the operation or cycle of controlling the supply of aggregate from a supply bin to one of the batchers 2, but this cycle of operation would take place, of course, in respect to all batchers 2 which are selected originally by the manipulation of the switches 28. Therefore, it must be borne in mind that other switches 121 to 131 besides the switch 127 will perform their function at the same time as the function of the switch 127 is performed. Those switches of the group numbered 125 to 131 inclusive, of the batchers which are not selected, will remain closed during the entire operation of the cycles appertaining to the batchers which are selected for operation so that, therefore, when the switches of the group 125 to 131 for the selected batchers 2 are closed, then all of the switches of said group will be closed and this conditions the manual discharge control valve 30 for manual operation by releasing of the pin 31 therefrom. It will therefore be seen that when all the switches 125 to 131 are closed, the current flows, see Figure 6, from the power line 86, over wire 165, switch 125, wire 166, switch 126, wire 167, switch 127, wire 168, switch 128, wire 169, switch 129, wire 170, switch 130, wire 171, switch 131, wires 172, 173, to the other terminal of solenoid 32. The solenoid 32 is now energized and the lock pin of the discharge valve 30 is released so that the same may now be operated, as stated above, to open the discharge gates of all the batchers 2; those batchers which have been supplied with aggregates will be discharged, of course, while the empty batchers will not function to discharge any material.

*Discharge of batchers into turnhead chute 13*

The operator at the central station control stand 1 having operated the main discharge control valve 30 unlocked in the manner previously set forth, air is supplied by said valve 30 to act on the various rams 23 of the discharge gates for the batchers 2 and the aggregate materials in the batchers now pass downwardly to the collecting hopper 12 and the turnhead chute 13. The mixer S, which is the one which has been described as used for the cycle of operation previously set forth, is now supplied with aggregates charged thereinto from the chute 13 previously adjusted for this purpose, as set forth already. The chute 13 operating mechanism, previously described, functions to actuate the batchmeter selector air valve 80, previously mentioned, in order to select the batchmeter 51 which is associated with and controls the mixing time for the mixture of materials now in the mixer S.

The operation of the control valve 30 for the discharge of the aggregates from the batchers 2 to the mixer S causes air to be admitted through the batchmeter selector air valve 80 to the ram 54 of the batchmeter 51 associated with the said mixer S, which sets the batchmeter into operation to time the mix in the mixer in accordance with the general mode of operation and use of batchmeters as known in the art. The manner of flow of the pressure fluid to the batchmeter ram 54 under the control of the valve 30 will be presented hereinafter in conjunction with the piping diagram for supplying air to the various rams at all parts of the plant. Simultaneously with the setting of the batchmeter 51, as stated, air is admitted to the air ram 174, see Figure 5, associated with the respective batchmeter of the circuit for mixer S, thereby opening the cooperating switch 96, previously referred to in describing the tilting and restoring movements of the mixer S. Thus the flow of all current through the circuits for the tilting and restoring of the mixer S is interrupted, making necessary the complete movement of the mixer S to its tilted position, and consequently the complete discharging of said mixer S, and before the mixer S can be used for another mixing operation to thereby again control the circuits associated with said mixer, the mixer S must be fully restored to its charging position. If this is not done another charge cannot be placed in the mixer S.

The setting of the batchmeter 51 for the mixer S causes opening of the mercury switch 55, Figures 5 and 18. This opening of the switch 55 de-energizes the solenoid 175, thus releasing the lock pin of the tilting valve SA for the mixer S, and in this way said tilting valve is locked in closed position and the mixer S cannot be tilted until the batchmeter 51 has completed its timing operation and trips off or has released. In this way it will be apparent that the condition of the batchmeter 51 of the mixer S, and the same applies equally to the batchmeters of the other mixers in their order of operation, determines the operativeness of the controlling tilt valve or valves, and ensures that the tilt valve or valves will remain locked until the completion of the mixing time for the mixer or mixers. The tripping off or release of the batchmeter thus conditions the associated mixer for its tilting action to discharge its contents onto the conveyor belt below the same or onto any other receiver which may be provided at this part of the plant to receive the mixed concrete ready for carrying off to the site where it is to be used. When the mixing time has elapsed, see Figures 5 and 18, the batchmeter trips off and closes the mercury switch 55, and this energizes the solenoid 175, releasing the corresponding lock pin 4a and unlocking the mixer tilting control valve associated therewith so that the latter can be manually operated to tilt the mixer to discharge position.

Referring to Figure 2, if the switch 35 has been moved to the 36 position, the solenoid valve 37 associated with the tilting valve SA will be rendered operative at the same time the solenoid 175 is energized, and the operation of this solenoid valve 37 will automatically cause the tilting operation of the mixer by admitting air to the ram 15 of the mixer S from the general pipe line of the plant. A detail of the solenoid valve 37 which controls the automatic tilting operation of mixer S is shown in Figure 15. In explanation of the foregoing it is noted that the manual valve SA, Figure 2, which is practically of the same construction, with locking pin control, as the valve 30, is in the same pipe line as the valve 38 which is automatically operated by the solenoid 37. This renders it easy to avail of either the manual or automatic operation for the tilting of the mixer to its discharge position.

The mixer S is now in its tilted or discharged position and its contents have been fully discharged as stated. This mixer S now stays in its discharged position and the apparatus is conditioned for operation in conjunction with the next mixer, which will be E in the order of rotation of use previously suggested. This is the end of the cycle which was originally started in this description by setting forth the manner of bringing the mixer S to charging position. The cycle of the operation for use of the next mixer E will be identical with the cycle previously stated as regards mixer S, and will begin with the operation of operating the tilt valve EA to bring the mixer E to its charging position.

*Aggregates proportioning control*

It has been developed before herein that the variable proportioning of the aggregates which are to make up a batch to go to a selected mixer is effected by rendering operative any one of a plurality of different weigh beams such as 8, 9, 10, and 11, seen in Figure 11. The extent of the proportioning control depends upon the number of these beams, which may be increased or decreased dependent upon the desired capacity of the plant and the extent of the requirements for variably proportioned batches which the particular construction may require, in which construction the mixed concretes are to be emplaced.

Referring to Figures 2 and 13, the manner in which the particular proportioning of the different aggregates selected for a batch is carried out, will now be set forth. As seen in Figure 11, there are four weigh beams 8 to 11 inclusive, and each weigh beam will weigh a different amount of aggregates supplied to the associated batcher 2. The beam lifter 24 for each of the beams 8 to 11 is rendered inoperative when the particular beam is to be put into use for a proportioning operation. Illustrative of the proportioning system, we will say that for the proportions of mix No. 1 the beams No. 1, or topmost weigh beams 8 of the batchers 2 will be rendered operative, and they will weigh the proper amounts of the aggregates balanced in the batchers. The weights for the weigh beams 8 to 11 inclusive are of course pre-set for the particular weights of aggregates desired to be used in the combinations for the batches. For mix No. 2 we will say that the second from the uppermost weigh beams 9 of the batchers will be rendered operative. For mixes No. 3 and No. 4 the two beams 10 and 11, respectively, of the batchers will be thrown into action. The valve 58, which is called the beam selector valve, previously referred to, see Figure 2, showing the control stand, is adjustable from a neutral position to four operating positions which may be indicated on the casing of the valve as shown at 58a, Figure 2. A manual lock pin 58b, Figure 3, may be used to cooperate to hold the valve handle or lever of the valve 58 in its neutral or any one of its four operating positions.

Reference to the diagram of Figure 13 will illustrate the simple method of control. Here the beam selector valve 58 is shown as connected by piping arrangements 57 leading to the various rams 25 that actuate the beam lifters 24. In the position which the valve 58 assumes for the No. 1 mix the air is supplied by the valve 58 to the rams 25 of the beam lifters 24 for all of the beams 8. The lifters 24 are thus depressed and unlock the beams 8 and permit these beams to perform their balancing function in respect to the associated batchers 2. If the valve 58 is turned to its No. 3 operating position for obtaining the so-called mix No. 3 wherein the various weigh beams 8, 9, and 11 are inoperative, and the weigh beams 10 are rendered operative, the weights of the materials fed into the batchers 2 will be controlled by the beams 10 only of the batchers and the No. 3 mix of aggregates will be obtained. The diagrammatic view of Figure 13 is largely self-explanatory in conjunction with the foregoing description.

In reference to the diagrammatic illustrations of the various circuits as shown in Figure 6 for instance, since a number of the branch circuits are identical, reference characters have been applied only to the parts of the circuits used in connection with the cycle of operation including the mixer S and the selected weighing batcher for ¼" gravel. It will be understood, however, that the same reference characters would be applicable to other branch circuits and associated electric connecting lines or wires for other mixers and weighing batchers, though the said reference characters are not applied thereto since they would be merely duplicative. Where certain of the circuit arrangements include some additional features not explained herein, such features will be understood to be merely auxiliary or additions to the features specifically described, involving the operation of parts that are not material to the invention and therefore need not be set forth herein.

The foregoing is largely applicable to the diagrammatic illustrations of Figure 5 wherein the reference characters are applied only to a single one of the circuit arrangements, namely that including parts of the batchmeter stands, which parts are used in the cycle of operation of the mixer S and associated batcher 2.

Referring to Figure 19, it is noted that in this figure the various rams which are used at various parts of the plant or apparatus of the invention, and associated valves and connections, are diagrammatically illustrated and numbered in accordance with the designations hereinbefore referred to as applicable to the same.

The piping connections which carry the pressure fluid to the rams from a main supply reservoir over the pipe line 176 include piping connections leading to the reservoir 177 wherein pressure is maintained at about 50 lbs. by reducing valve 178. The pressure of the pressure fluid coming from the line 176 is 100 lbs. approximately. Variation in the pressures in the main line 176 leading to one side of the rams 15, and the lower pressure in the reservoir 177 leading to the other side of the rams 15, is availed of for the operation of the rams 15 at the higher pressure to tilt the mixers S, E, N, W to their discharge positions. The lower pressure of the pressure fluid coming from the reservoir 177 is availed of to restore the mixers aforesaid to their charging positions. It is noted that the method of application of the air pressure to the rams, so far as detail connections and arrangements are concerned, is not material to the present invention, being embodied in suitable adaptations in my copending application for patent, Serial No. 659,760, filed March 6, 1933. Of course the arrangement of the pipe connections as shown in this Figure 19 are diagrammatic.

Insofar as the major flow and minor or final flow control means for the batchers 2 are concerned, the same being interposed between the bins B and said batchers 2, it may be noted that any conventional devices of this type at present known in the art may be resorted to. However, in my application previously identified there are illustrated such major and minor flow control features as would be usable in conjunction with the mixing plant of this invention, and such features could be adopted in the present construction.

General operation of plant

Bearing in mind that the operator is stationed at the control stand 1 of the plant, he will receive orders from the engineer or other person in charge of the construction work where the mixed concrete is to be emplaced. An order coming in for concrete composed of certain sized aggregates may be received by telephone or otherwise, whereupon the operator working at the control board of the stand 1 will operate the selector switches 28 to call into action the desired batchers 2. Assuming that the order calls for special weights or measures of aggregates obtainable with the use of certain ones of the weigh beams 8, 9, 10, and 11, the operator will set the valve 58 in a proper position to select the proper set of corresponding beams for the different batchers 2 that are called into action. In this way the operator controls the proper proportioning of the weights of the aggregates for the particular mix desired. Then the cycle of operation of the entire plant, as has been given before in relation to the mixer S, commencing with the placing of said mixer, or the mixer selected for use, in charging position, is carried through. In this way the particular batch of concrete to be mixed is selected as to the kinds of materials and as to the proportions of such materials as hereinbefore pointed out.

From the foregoing it will be seen that my plant control means affords to the operator instrumentalities whereby he may very quickly select the particular kinds of aggregates that are going into each batch, and he may at the same time very quickly select the required proportions of such aggregates, all to the end of affording an efficient and quickly operating control for the entire plant operation.

Additionally, during such operations the interlocking controls provided ensure the proper action of the various parts in regular order, and prevent their operation if said parts are not ready for use, or adjusted to proper positions to coordinate their cooperative functions.

Having thus described my invention, what I claim as new and desire to secure by Letters Patent of the United States, is:

1. In a materials proportioning plant, in combination, supply means for different kinds of aggregates to be mixed, a plurality of batchers arranged to receive each a particular kind of said aggregates from the supply means, control means for selectively rendering one or more of said batchers operative to measure a predetermined quantity of the aggregate received therein, instrumentalities for causing the aggregate or aggregates to pass into the selective batchers and to be discharged therefrom, quantity measuring appliances associated with each batcher to vary the amount of aggregate that may be measured therein, and control means for selecting for operation with each batcher a predetermined one of such appliances so that when the batchers are discharged the aggregates flowing therefrom will be controllably proportioned in relation to one another.

2. In a materials proportioning plant, in combination, supply means for different aggregates to make up a batch of mixed materials, a plurality of batchers associated with the supply means and each adapted to receive a particular kind of aggregate from the supply means to be measured in the batcher, a plurality of measuring appliances associated with each batcher whereby different quantities of the aggregate handled by such batcher may be measured in successive operations of the batcher, control means for selectively rendering operative a predetermined one of the said measuring appliances of each batcher whereby in consecutive batches of materials discharged from the batchers different measured quantities of aggregates properly proportioned respecting the aggregates discharged from the batchers may be obtained, and instrumentalities controlling the supplying of the batchers with aggregates from the supply means and the discharging of the aggregates from the batchers.

3. In a materials proportioning plant, in combination, supply means for different aggregates to go into a batch of materials, proportioning means for each aggregate supplied from the supply means for measuring different quantities of each aggregate, selective means for selectively rendering operative different ones of the proportioning means for one aggregate to be used in connection with a selected one of the proportioning means of another aggregate, and means for discharging the aggregates from the proportioning means for the different aggregates to make up a batch of materials comprising the said different aggregates.

4. In a materials proportioning plant, in combination, supply means for different aggregates to go into a batch of materials, a proportioning device for each aggregate comprising a plurality of measuring appliances each for measuring a different quantity of said aggregates, common control means for the measuring appliances for each of the aggregates for selectively rendering operative a predetermined one of the said measuring appliances for each aggregate, and instrumentalities for causing each aggregate to be supplied to its proportioning device and for discharging the aggregates from the proportioning devices after the same are measured by selected ones of the measuring appliances of each proportioning device.

5. In a materials proportioning plant, in combination, supply means for different kinds of aggregates, a proportioning device for each kind of aggregate associated with the supply means to receive an aggregate therefrom, said proportioning devices each comprising a plurality of measuring appliances to measure in the proportioning devices different quantities of the particular aggregate handled thereby, means for selectively rendering operative any desired one of the measuring appliances for each proportioning device, whereby selected desired measured quantities of aggregates from the several proportioning devices may be measured therein and discharged therefrom, and mechanism for selecting a predetermined one or more of the proportioning devices for operation while others of such devices are maintained out of operation, together with instrumentalities for controlling the feeding of aggregates from the supply means to the proportioning devices.

6. Proportioning means for central mixing plants, comprising, in combination, a plurality of supply means, a plurality of proportioning devices associated with said supply means to receive aggregates therefrom, control instrumentalities for selecting a plurality of said proportioning devices, control means for rendering the selected proportioning devices operative, a plurality of weighing mechanisms associated with each proportioning device to determine the quantity of materials measured thereby, and control means for rendering a selected one of said weighing mechanisms operative to act in conjunction with its proportioning device.

7. In a materials proportioning plant, in combination, supply means for a plurality of different aggegates, proportioning devices, one for each kind of aggregate, associated with the supply means, mechanism for selectively putting one or more of the proportioning devices into operation, mechanism for causing the supply of aggregate to said device and the discharge of said aggregate therefrom when properly proportioned therein, variable quantity control mechanism associated with each proportioning device to cause it to measure different quantities of its aggregate at will, and selective instrumentalities cooperating with said variable quantity control mechanism to vary the action of the latter.

8. In a materials proportioning plant, in combination, a supply means for different aggregates, a plurality of proportioning devices, one for each aggregate, associated with the supply means, each proportioning device comprising a plurality of differently adjusted weighing mechanisms, and instrumentalities for selectively putting into action any one of the weighing mechanisms of each proportioning device.

9. In a materials proportioning plant, in combination, a supply means for different aggregates, a plurality of proportioning devices, one for each aggregate, associated with the supply means, each proportioning device comprising a plurality of differently adjusted weighing mechanisms, instrumentalities for selectively putting into action any one of the weighing mechanisms of each proportioning device, and instrumentalities for selectively putting into operation one or more of the proportioning devices and for causing the feeding of the aggregate thereto and discharge of the aggregate therefrom.

10. A materials proportioning plant comprising, in combination, a plurality of supply means, a plurality of proportioning devices associated with the supply means to receive aggregates therefrom, control instrumentalities for selecting a plurality of proportioning devices for operation, instrumentalities for controlling the proportioning of the aggregates in said proportioning devices, discharge means for the proportioning devices, a common control for said discharge means, parts intermediate the control instrumentalities for selecting a plurality of proportioning devices and said common discharge control means, whereby the instrumentalities for selecting the proportioning devices control the common control means for the discharge means.

11. A materials proportioning plant comprising, in combination, a plurality of supply means, a plurality of proportioning devices associated with the supply means to receive aggregates therefrom, control instrumentalities for selecting a plurality of proportioning devices for operation, instrumentalities for controlling the proportioning of the aggregates in said proportioning devices, discharge means for the proportioning devices, a common control for said discharge means, and parts intermediate the control instrumentalities for selecting a plurality of proportioning devices and said instrumentalities for controlling the proportioning of the aggregates in the proportioning devices, whereby the instrumentalities for selecting a plurality of proportioning devices and said instrumentalities for controlling the proportion of the aggregates in the proportioning devices control the common control means for the discharge means.

12. In a central mixing plant, in combination, supply means for aggregates, a plurality of batchers, one for each aggregate receivable from the supply means, means to render the batchers operative, a mixer, a chute movable to supply materials from the batchers to the mixer, a main discharge control device for discharging the batchers when aggregates are properly measured therein, lock means to prevent operation of said main discharge control device, and control connections operated under the control of the mixer and the said chute for releasing said lock means.

13. In a central mixing plant, in combination, supply means for aggregates, a plurality of batchers, one for each aggregate receivable from the supply means, means to render the batchers operative, lock means for the latter, a plurality of mixers, a turnhead chute for supplying aggregates from the batchers to a selected one of the said mixers, and inter-connections between the lock means and the said mixers whereby when a selected mixer assumes a predetermined condition the lock means is released.

14. In a central mixing plant, in combination, supply means for aggregates, a plurality of batchers, one for each aggregate receivable from the supply means, means to render the batchers operative, a mixer, a chute movable to supply materials from the batchers to the mixer, a main discharge control device for discharging the batchers when aggregates are properly measured therein, lock means to prevent operation of said main discharge control device, control connections operated under the control of the mixer and the said chute for releasing said lock means, weighing mechanism for each batcher, and control connections from the various weighing mechanisms of the batcher cooperating to prevent release of the lock means until the batchers are in balance with their weighing mechanisms.

15. In a central mixing plant, in combination, supply means for aggregates, a plurality of batchers, one for each aggregate receivable from the supply means, means to render the batchers operative, a mixer, a chute movable to supply materials from the batchers to the mixer, a main discharge control device for discharging the batchers when aggregates are properly measured therein, lock means to prevent operation of said main discharge control device, control connections operated under the control of the mixer and the said chute for releasing said lock means, a plurality of weighing mechanisms associated with each batcher to variably measure aggregates to be received in the batcher, selective control mechanism for rendering a selected one of the weighing mechanisms for each batcher operative to counterbalance its associated batcher after charging of aggregates to predetermined weight therein, and connections under the control of said selected weighing mechanism of each batcher cooperating to release the lock means aforesaid when the selected weighing mechanism and its batcher become balanced.

16. In a central mixing plant, in combination, a supply means for different aggregates, a plurality of batchers, one for each aggregate, cooperating with the supply means, a mixer, a chute intermediate the batchers and the mixer, batcher selector means for rendering certain batchers operative, proportioning mechanism for each batcher to measure different amounts of material therein, selector means for selecting the proportioning mechanism for each batcher to be rendered operative, discharge means for the batchers, a main control device for said discharge means, lock means for preventing operation of said main control device, and coacting connections common to the mixer, the said chute, the selector means for the batchers, and the selector means for the proportioning mechanism rendered operative when said parts are conditioned in a predetermined manner so as to release the lock means aforesaid.

17. In a central mixing plant, in combination, aggregate supply means, a plurality of batchers for different aggregates, selector means for rendering one or more of said batchers operative, each batcher comprising variable measuring mechanism for the aggregate received therein, a mixer, discharge means for the batchers to supply the contents of the batchers to the mixer, a main discharge control device for the discharge means of the batchers, and interlocking control connections for preventing the operation of the main discharge control device until the measuring of the amounts of aggregates in the batchers is complete, the mixer is conditioned to receive the aggregates discharged from the batchers, and the selecting means for the batchers are conditioned for operation.

18. In a central mixing plant, in combination, a plurality of batchers, discharge means therefor, a plurality of mixers adapted to be placed in charging and discharging condition, a movable chute adjustable to convey aggregates from the batchers to a selected one of the mixers, proportioning means for varying the proportion of aggregate received in each batcher in relation to aggregate received in another or other batchers, selecting means for said proportioning means, selecting means for rendering one or more batchers operative, a main discharge control device for causing discharge of selected batchers placed in operation, lock means to prevent operation of said main discharge control device, and connections intermediate said batcher selecting means, movable chute and selecting means for the proportioning means operative when a mixer is conditioned for charging, when the said chute is conditioned to charge said mixer, when predetermined batchers have been selected for operation, and when selected proportioning mechanisms have operated to correctly proportion the aggregates in the batchers, whereby to release said lock mechanism and permit operation of the main discharge control device.

19. A central mixing plant substantially as claimed in claim 18, combined with a batchmeter associated with each mixer for controlling the elapsed time of mixing of combined aggregates in said mixer, and connections between said batchmeters and said main discharge control device whereby a batch meter for a mixer selected to receive the aggregates from the batchers is set into operation upon actuation of said main discharge control device.

20. In a central mixing plant, in combination, batchers, supply means therefor, discharge means for the batchers, mixers, a turnhead chute adjustable to feed materials from the batchers to a selected mixer, and control means for preventing operation of the discharge means for the batchers governed by the position of the mixers and turnhead chute.

21. In a central mixing plant, in combination, batchers, supply means therefor, discharge means for the batchers, mixers, a turnhead chute adjustable to feed materials from the batchers to a selected mixer, a main discharge control device for operating the discharge means aforesaid, and preventing means to prevent the operation of the main discharge control device coacting with the turnhead chute and the mixers to release the main discharge control device when a selected mixer assumes a predetermined position and the turnhead chute is adjusted to a proper position to supply said selected mixer.

22. In a central mixing plant, a combination of batchers, selectively operable different weighing mechanisms cooperative with each batcher to measure charges therein, mixers, a turnhead chute operable to selectively feed materials from the batchers to a selected mixer, means to move a selected mixer to charging position, means to move the turnhead chute to proper position to charge a mixer, a main discharge control device for discharging the contents of the batchers into the turnhead chute, and lock mechanism for the main discharge control device operatively connected with the mixers, turnhead chute, and the batchers and releasable only when these parts assume predetermined control positions for effecting such release.

23. In a central mixing plant, in combination, a plurality of batchers, a plurality of weigh mechanisms associated with each batcher, means to selectively control the weigh mechanisms for the various batchers to put one weigh mechanism for each batcher into action, mixers adapted to be conditioned to be charged by the batchers, a main discharge control device for the batchers normally locked out of operation, and control means intermediate said main discharge control device, a selected mixer, and the batchers for unlocking the main discharge control device when the batchers assume predetermined positions and a selected mixer assumes a predetermined condition.

24. In a central mixing plant, in combination, a plurality of batchers, batcher discharge means, a plurality of weighing devices for balancing each batcher, selective means for rendering certain weighing devices operative, a turnhead chute movable to adjusted positions for feeding materials from the batchers to a mixer, a plurality of mixers and selective means for rendering a mixer operative to be charged by the chute, a main discharge control device for operating the batcher discharge means, lock means for said main discharge control device, and electric circuit means connected with the batchers, the turnhead chute, and the mixers, whereby, when a selected mixer is in charging position, when the batchers are in balanced condition, and when the turnhead chute is in a predetermined operating position, the main discharge control device will be unlocked.

25. In a central mixing plant, in combination, a plurality of batchers, batcher discharge means, a plurality of weighing devices for balancing each batcher, selective means for rendering certain weighing devices operative, a turnhead chute movable to adjusted positions for feeding materials from the batchers to a mixer, a plurality of mixers and selective means for rendering a mixer operative to be charged by the chute, a main discharge control device for operating the batcher discharge means, lock means for said main discharge control device, electric circuit means connected with the batchers, the turnhead chute, and the mixers, whereby, when a selected mixer is in charging position, when the batchers are in balanced condition, and when the turnhead chute is in a predetermined operating position, the main discharge control device will be unlocked, a batchmeter for governing the action of each mixer operable to be set off on actuation of the main discharge control device, and automatic discharging mechanism for the mixers, one of which is rendered operable by the tripping of the batchmeter after the elapse of a predetermined mixing period therefor.

26. A central mixing plant, comprising, in combination, batchers, supply means therefor, discharge means for the batchers, mixers, means for rotating said mixers, instrumentalities to feed materials from the batchers to a selected mixer, and devices for preventing operation of the discharge means for the batchers governed by the operation of the means for rotating said mixers, the position of said mixers and said instrumentalities.

27. In a materials proportioning plant, in combination, supply means for different aggregates, proportioning devices for receiving each one of said aggregates from the supply means, mechanism for selectively rendering operative the proportioning devices, a plurality of measuring instrumentalities for each proportioning device, and a common control for said measuring instrumentalities for rendering one of said measuring instrumentalities for each proportioning device operative for measuring a predetermined quantity of materials handled by each proportioning device.

28. In a materials proportioning plant, in combination, supply means for different aggregates, proportioning devices for receiving each one of said aggegates from the supply means, a plurality of selective weigh beam mechanisms for each proportioning device, and a common control for said weigh beam mechanisms for rendering any one of said beam mechanisms for each proportioning device operative for measuring a predetermined quantity of materials handled by each proportioning device.

29. In a materials proportioning plant, in combination, supply means for different aggregates, proportioning devices for receiving each one of said aggregates from the supply means, a plurality of selective weigh beam mechanisms for each proportioning device, and an adjustable common control for said beam mechanisms for rendering certain beam mechanisms for each proportioning device operative when said control is in one position of operation, and for rendering other beam mechanisms for each proportioning device operative when said control is in another position of operation to thereby variably measure the quantity of materials handled by each proportioning device.

30. In a central mixing plant, in combination, batchers, supply means therefor, discharge means for the batchers, a plurality of mixers, means for moving the mixers consecutively to charging and discharging positions, control means for effecting the operation of the discharge means of the batchers when said mixers are in charging position, and means for preventing a second discharge from said batchers to said mixers before said mixers have been moved to discharging position.

31. In a materials proportioning plant, in combination, supply means for different aggregates, proportioning devices for receiving each one of said aggregates from the supply means, a plurality of measuring instrumentalities for each proportioning device, and a common control for said measuring instrumentalities for rendering one of said measuring instrumentalities for each proportioning device operative for measuring a predetermined quantity of materials handled by each proportioning device.

32. In a central mixing plant, in combination, aggregate supply means, batchers, discharge means for said batchers, a plurality of mixers to receive aggregates from the batchers, means for moving the mixers to charging and discharging positions, discharge control means for the batchers, instrumentalities maintaining said discharge control means inoperative until at least one of the mixers is in charging position, and devices for interconnecting the discharge control means with said means for moving the mixers for causing successive cooperation of the mixers with the discharge means of the batchers.

33. In a materials proportioning plant, in combination, proportioning devices each one for receiving a certain aggregate from a source of aggregate supply for proportioning operation, common discharge means for said proportioning devices, mixers, batchmeters associated with said mixers, means for selecting and conditioning one of said mixers and its associated batchmeter at a time for operation, and instrumentalities for causing operation of said conditioned batchmeter of said selected mixer upon operation of said common discharge means.

34. In a materials proportioning plant, in combination, proportioning devices each one for receiving a certain aggregate from a source of aggregate supply for proportioning operation, common discharge means for said proportioning devices, mixers, batchmeters associated with said mixers, means for selecting and conditioning certain mixers and batchmeters for operation, and instrumentalities for causing operation of said selected mixers and batchmeters upon operation of said common discharge means.

CHARLES S. JOHNSON.